United States Patent
Wulf et al.

(10) Patent No.: US 7,632,007 B2
(45) Date of Patent: Dec. 15, 2009

(54) BLENDER BASE WITH FOOD PROCESSOR CAPABILITIES

(75) Inventors: John Douglas Wulf, Boca Raton, FL (US); Gerald J Lozinski, Parkland, FL (US); Matthew Craig Denton, Hattiesburg, MS (US); Jerry Lee McColgin, Westfield, IN (US); Michael Morton, Boca Raton, FL (US); Daniel S. Soultanian, Hattiesburg, MS (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 12/399,251

(22) Filed: Mar. 6, 2009

(65) Prior Publication Data

US 2009/0168593 A1 Jul. 2, 2009

Related U.S. Application Data

(60) Continuation of application No. 11/657,948, filed on Jan. 24, 2007, now Pat. No. 7,520,659, which is a division of application No. 10/438,437, filed on May 15, 2003, now abandoned, which is a division of application No. 09/835,118, filed on Apr. 13, 2001, now Pat. No. 6,609,821.

(51) Int. Cl.
*B01F 15/00* (2006.01)

(52) U.S. Cl. ............... 366/142; 318/434; 318/474; 318/280; 366/205; 366/206; 366/601

(58) Field of Classification Search ............ 99/348; 366/142, 205, 206, 601; 318/10, 434, 474, 318/476, 280
See application file for complete search history.

(56) References Cited

U.S. PATENT DOCUMENTS

| 2,109,501 | A | | 3/1938 | Osius |
| 2,564,553 | A | * | 8/1951 | Waterstone ............... 318/453 |
| 2,667,308 | A | | 1/1954 | Hammes |
| 2,678,775 | A | | 5/1954 | Simmons |
| 2,733,052 | A | | 1/1956 | Luther |
| 2,733,396 | A | | 1/1956 | Luther |

(Continued)

FOREIGN PATENT DOCUMENTS

DE 21 41 813 8/1971

(Continued)

OTHER PUBLICATIONS

Anonymous, *Vita-Mix® Touch and Go™ Blending Station®: Owner's Manual*, Vita-Mix® Corporation, pp. 1-27ff (1999).

Primary Examiner—Joseph W Drodge
(74) Attorney, Agent, or Firm—Seth M. Blum

(57) ABSTRACT

A blender base that may be used with a food processor container, a blender container, and a single use beverage container. The blender container includes a novel blade unit having a food processor-style blade and blender type blades. Programs with preprogrammed motor commands for desired operations are stored in memory and may be selected by a user on a user interface. The user interface may include a liquid crystal display, or function switches and light emitting diodes. Upon selection of a particular pre-defined function, the microcontroller retrieves the appropriate program from the read only memory and specifies the preprogrammed motor commands to accomplish the selected function.

4 Claims, 18 Drawing Sheets

U.S. PATENT DOCUMENTS

| | | | |
|---|---|---|---|
| 2,740,029 A | 3/1956 | Kueser et al. | |
| 2,758,623 A | 8/1956 | Malz et al. | |
| 2,771,111 A | 11/1956 | Seyfried | |
| 2,804,289 A | 8/1957 | Schwaneke | |
| 2,897,862 A | 8/1959 | Malz et al. | |
| 2,947,524 A * | 8/1960 | Bridges | 366/300 |
| 3,036,614 A | 5/1962 | Knapp | |
| 3,112,079 A | 11/1963 | Niekamp et al. | |
| 3,300,150 A | 1/1967 | Sones et al. | |
| 3,352,543 A * | 11/1967 | Niederman et al. | 366/286 |
| 3,368,800 A * | 2/1968 | Barnard, Jr. | 241/282.2 |
| 3,458,175 A | 7/1969 | Aoki et al. | |
| 3,548,280 A | 12/1970 | Cockroft | |
| 3,550,657 A | 12/1970 | Swanke | |
| 3,612,969 A | 10/1971 | Cockroft | |
| 3,721,875 A | 3/1973 | Feldner et al. | |
| 3,784,118 A * | 1/1974 | Hurwitz | 241/282.1 |
| 3,833,845 A | 9/1974 | Smallbone et al. | |
| 3,856,220 A | 12/1974 | Waters | |
| 3,908,100 A | 9/1975 | Richard et al. | |
| 3,943,421 A | 3/1976 | Shibata et al. | |
| 3,955,430 A * | 5/1976 | Rhoads | 74/89.2 |
| 3,962,615 A | 6/1976 | Spangler | |
| 4,087,053 A | 5/1978 | Voglesonger | |
| 4,297,038 A | 10/1981 | Falkenbach | |
| 4,459,524 A | 7/1984 | Oota et al. | |
| 4,541,573 A | 9/1985 | Fujiwara et al. | |
| 4,568,193 A | 2/1986 | Contri et al. | |
| 4,681,030 A | 7/1987 | Herbert | |
| 4,822,172 A | 4/1989 | Stottmann | |
| 5,347,205 A | 9/1994 | Piland | |
| 5,380,086 A | 1/1995 | Dickson | |
| 5,410,236 A | 4/1995 | Arroubi | |
| 5,421,713 A * | 6/1995 | Backus et al. | 425/209 |
| 5,556,198 A | 9/1996 | Dickson, Jr. et al. | |
| 5,567,049 A | 10/1996 | Beaudet et al. | |
| 5,584,577 A | 12/1996 | Thies | |
| 5,655,834 A | 8/1997 | Dickson | |
| 5,669,095 A * | 9/1997 | Dausch et al. | 8/158 |
| 5,809,872 A | 9/1998 | Sundquist | |
| 5,819,636 A | 10/1998 | Khashoggi | |
| 5,823,672 A | 10/1998 | Barker | |
| 5,845,991 A | 12/1998 | Sundquist | |
| 6,092,922 A | 7/2000 | Kett et al. | |
| 6,095,677 A | 8/2000 | Karkos, Jr. et al. | |
| 6,123,449 A | 9/2000 | Sadek-Patt | |
| 6,242,839 B1 * | 6/2001 | Cefo | 310/233 |

FOREIGN PATENT DOCUMENTS

| | | |
|---|---|---|
| DE | 25 11 155 | 3/1975 |
| DE | 27 05 662 | 2/1977 |
| DE | 28 813 168 | 3/1978 |
| DE | 28 17 517 | 4/1978 |
| DE | 28 50 725 | 11/1978 |
| DE | 29 45 000 | 11/1979 |
| DE | 30 01 182 | 1/1980 |
| DE | 30 07 915 | 3/1980 |
| DE | 30 13 382 | 4/1980 |
| DE | 31 13 760 | 4/1981 |
| DE | 31 17 773 | 5/1981 |
| DE | 31 21 252 | 5/1981 |
| DE | 32 06 493 | 2/1982 |
| DE | 32 25 591 | 7/1982 |
| DE | 33 35 139 | 9/1983 |
| DE | 84 00 493 | 1/1984 |
| DE | 34 33 164 | 9/1984 |
| DE | 34 43 431 | 11/1984 |
| DE | 35 38 967 | 11/1985 |
| DE | 35 40 370 | 11/1985 |
| DE | 36 16 158 | 5/1986 |
| DE | 36 44 268 | 12/1986 |
| DE | 36 28 702 | 3/1988 |
| DE | 38 37 961 | 11/1988 |
| DE | 39 33 039 | 10/1989 |
| DE | 42 42 289 | 12/1992 |
| DE | 197 32 261 | 7/1997 |
| DE | 198 14 355 | 3/1998 |
| DE | 199 12 750 | 3/1999 |
| DE | 299 15 733 | 7/1999 |
| DE | 198 18 506 | 10/1999 |
| EP | 0 004 908 | 4/1979 |
| EP | 0 004 987 | 4/1979 |
| EP | 0 013 805 | 11/1979 |
| EP | 0 012 976 | 12/1979 |
| EP | 0 024 992 | 8/1980 |
| EP | 0 025 972 | 9/1980 |
| EP | 0 046 169 | 5/1981 |
| EP | 0 076 712 | 8/1982 |
| EP | 0 084 745 | 10/1982 |
| EP | 0 081 874 | 12/1982 |
| EP | 0 101 237 | 8/1983 |
| EP | 0 120 496 | 3/1984 |
| EP | 0 127 898 | 6/1984 |
| EP | 0 129 222 | 6/1984 |
| EP | 0 158 032 | 2/1985 |
| EP | 0 212 952 | 8/1986 |
| EP | 0 253 179 | 7/1987 |
| EP | 0 346 598 | 4/1989 |
| EP | 0 344 061 | 5/1989 |
| EP | 0 417 800 | 9/1990 |
| EP | 0 440 051 | 1/1991 |
| EP | 0 475 470 | 7/1991 |
| EP | 0 549 818 | 1/1992 |
| EP | 0 529 287 | 7/1992 |
| EP | 0 567 853 | 4/1993 |
| EP | 0 571 348 | 5/1993 |
| EP | 0 575 912 | 6/1993 |
| EP | 0 576 368 | 6/1993 |
| EP | 0 638 273 | 7/1994 |
| EP | 0 699 409 | 8/1995 |
| EP | 0 784 445 | 10/1995 |
| EP | 0 805 641 | 1/1996 |
| EP | 0 812 560 | 6/1997 |
| EP | 0 948 279 | 10/1997 |
| EP | 0 963 726 | 3/1999 |
| JP | H6-189863 | 7/1994 |
| WO | 95/24852 | 9/1995 |
| WO | 98/24350 | 6/1998 |
| WO | 98/43522 | 10/1998 |
| WO | 99/01060 | 1/1999 |
| WO | 99/17646 | 4/1999 |
| WO | 99/17647 | 4/1999 |
| WO | 99/17648 | 4/1999 |
| WO | 99/37193 | 7/1999 |
| WO | 00/13563 | 3/2000 |
| WO | 00/19878 | 4/2000 |
| WO | 00/24302 | 5/2000 |
| WO | 00/30515 | 6/2000 |
| WO | 00/30516 | 6/2000 |
| WO | 00/47093 | 8/2000 |

* cited by examiner

FIG. 25

```
           POWDERED DRINKS

FORWARD HIGH SPEED 15 SECONDS
  RAMP DOWN TO LOW, LOW FOR 5 SECONDS     — 264
   RAMP TO HIGH, HIGH FOR 15 SECONDS
    RAMP DOWN TO LOW FOR 5 SECONDS
   RAMP TO HIGH, HIGH FOR 20 SECONDS
```

FIG. 26

```
              BATTER

FORWARD HIGH SPEED 20 SECONDS
  REVERSE HIGH SPEED FOR 20 SECONDS       — 266
   FORWARD HIGH SPEED 15 SECONDS
  REVERSE HIGH SPEED FOR 10 SECONDS
```

FIG. 27

```
             MILKSHAKE

FORWARD PULSE HIGH 1 SECOND
                STOP
   FORWARD HIGH SPEED FOR 1 SECOND        — 268
                STOP
     FORWARD HIGH SPEED 40 SECONDS
```

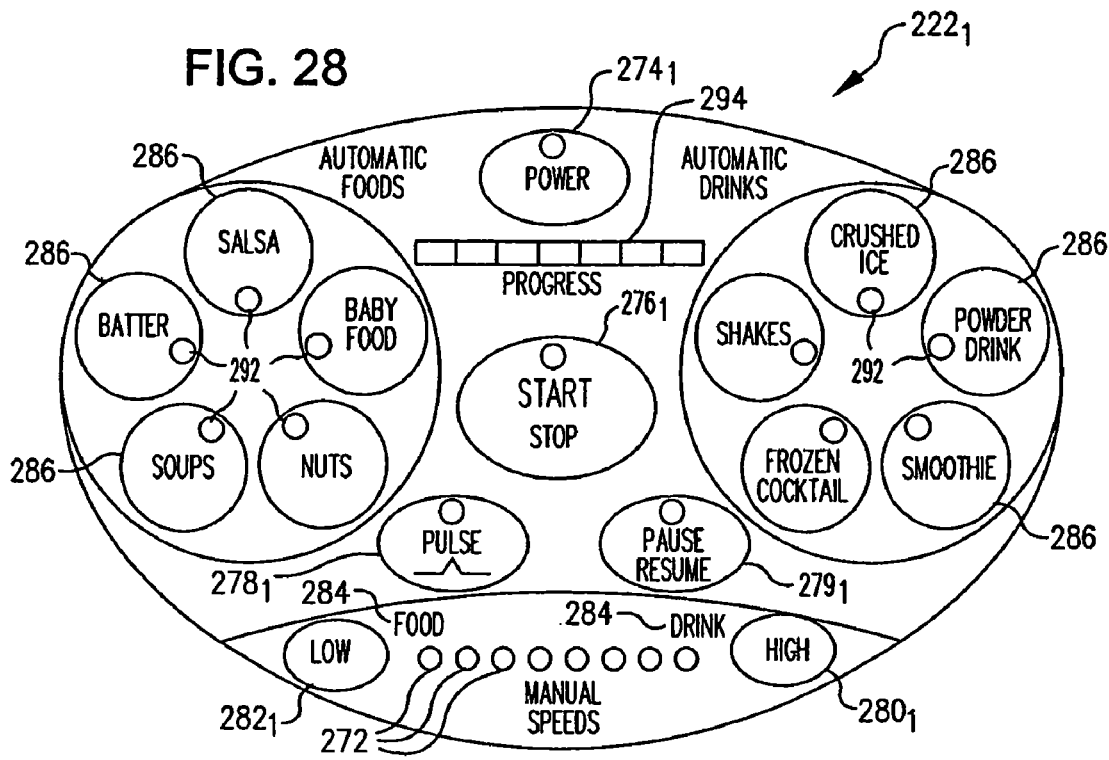
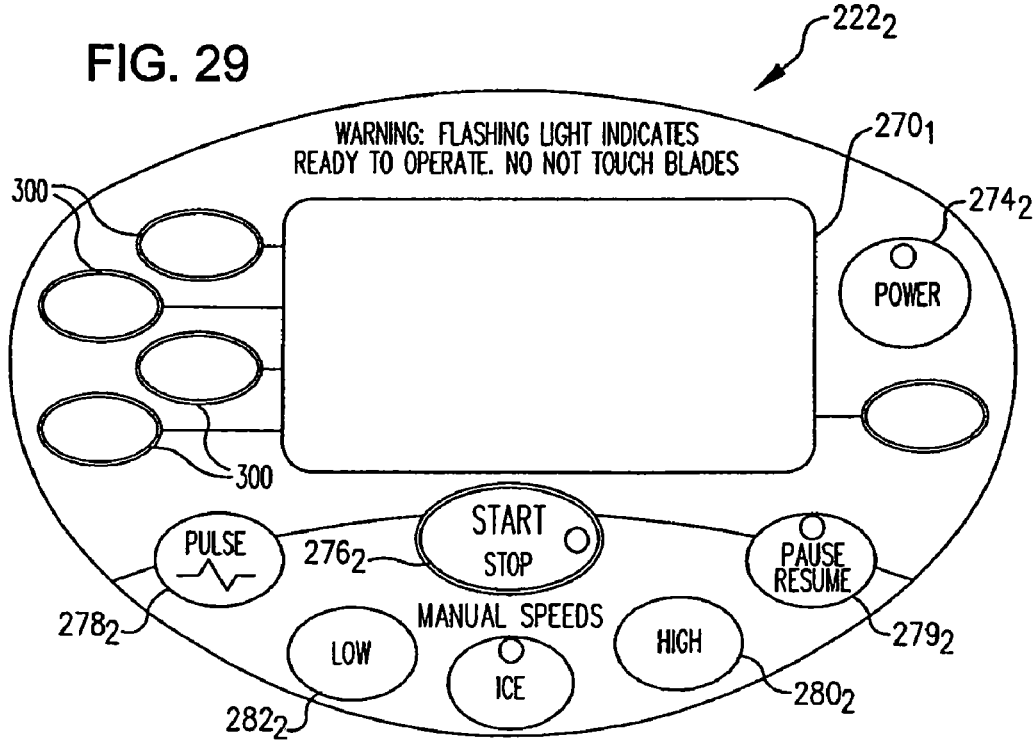

BLENDER BASE WITH FOOD PROCESSOR CAPABILITIES

This application is a continuation application of U.S. Nonprovisional patent application Ser. No. 11/657,948 filed on Jan. 24, 2007 now U.S. Pat. No. 7,520,659, which is hereby incorporated by reference in its entirety and which is a divisional application of U.S. Nonprovisional Patent Application Ser. No. 10/438,437 filed on May 15, 2003, now abandoned, which is hereby incorporated by reference in its entirety and which is a divisional application of U.S. Nonprovisional Patent Application Ser. No. 09/835,118, entitled, "BLENDER BASE WITH FOOD PROCESSOR CAPABILITIES" filed on Apr. 13, 2001, now U.S. Pat. No. 6,609,821, and which is hereby incorporated by reference in its entirety. The priority of application Ser. Nos. 09/835,119, 10/438,437, and 11/657,948 is claimed.

FIELD OF THE INVENTION

The present invention relates generally to household appliances, and more particularly to blenders and food processors.

BACKGROUND OF THE INVENTION

Blenders are household devices often used to blend or mix drinks or liquids. On the other hand, food processors are household devices commonly used to chop, cut, slice, and/or mix various solid foods such as vegetables, fruits, or meats. Different blade designs and rotation speeds are used in a blender or a food processor in order to accomplish the mixing or cutting actions desired.

Conventional household blenders typically have a motor connected to a blade assembly, and the speed of the rotating blade or motor may be varied based on selections made by the user.

For example, U.S. Pat. No. 3,678,288 to Swanke et al. describes a blender having seven speed selection push buttons. The push-buttons drive slider elements that close switches so as to selectively energize various combinations of fields in a drive motor having multiple fields. Field selection provides seven speeds in a high range. Seven speeds in a low range are obtained by applying only half cycles of the AC energizing voltage to the motor when certain combinations of the switches are actuated. Once a speed selection push button is depressed, the motor is energized until an OFF switch is actuated. The device also has a jogger or pulse mode pushbutton that energizes the motor at one speed only as long as the pushbutton is depressed. Pulsing the motor on/off or at high and then low speeds permits the material being blended to fall back to the region of the cutting knives thereby improving the blending or mixing of the material.

U.S. Pat. No. 3,951,351 to Ernster et al. describes a blender having a rotary switch for selecting a high or low range of speeds and five pushbutton switches for selecting a speed within the selected range. The pushbutton switches connect various segments of the motor field winding in the energizing circuit. This device also includes a pulse mode pushbutton that causes energization of the motor only as long as the pushbutton is depressed. The motor may be energized in the pulse mode at any selected speed.

U.S. Pat. No. 3,548,280 to Cockroft describes a blender provided with 10 speed selection switches. A SCR is connected in series with the motor and has a control electrode connected to resistances that are brought into the electrode circuit by actuation of the speed selection switches to control the angle of firing of the SCR and thus the speed of the motor. This device also has a mode selection switch for selecting the manual mode or a cycling or pulse mode in which the motor is alternately energized and deenergized over a plurality of cycles, the number of cycles being set by a potentiometer controlled by a rotatable knob. In a preferred embodiment, the on and off intervals are set during manufacture but two potentiometers may be provided to enable an operator to vary the on and off times.

U.S. Pat. No. 5,347,205 to Piland describes a blender with a microcontroller for controlling energization of the blender drive motor. The speed of the motor is determined by a manual selection of N speed range selection switches, M speed selection switches, and a pulse mode switch.

Typically, the blade attachment in conventional blenders consists of two generally U-shaped blades, a top blade and a bottom blade, joined together at a central point with their respective ends oriented in opposite directions. Because of this blender blade design, conventional blenders usually are not able to successfully chop, slice, or cut solid food because solid food does not flow into the U-shaped blades without adding liquid. Although the solids may make some contact with the blades, typically at least some liquid must be added to the blender in order to successfully liquefy or cut the solid food into very small pieces.

Another drawback with blenders is the number of different operations that must be performed to successfully blend a mixture. Typically, to blend or mix items in a blender, a user will press a sequence of buttons on the blender. For example, to chop ice, a user may hit a slow button, wait a while, hit a faster speed, wait, hit yet a faster speed, etc. The user may have to stop the blending process to dislodge ice or to assure the ice is coming into contact with the blades.

This process can be very frustrating, and with conventional blenders may still result in an unsatisfactory chopping or blending of the items in the blender.

SUMMARY OF THE INVENTION

In accordance with one aspect of the present invention, a blender is provided that is programmed to accomplish predetermined functions and routines. The routines are preprogrammed into a microcontroller of the blender and include motor commands that are automatically accessed and implemented upon selection of a desired function. For example, the blender may be preprogrammed with a plurality of routines designed for particular food or drink items, such as by taking a particular sequence of motor commands (e.g., direction of rotation, speed, duration or time of rotation, etc.) which are automatically implemented based on the function (e.g., end result) selected by the user.

In an exemplary embodiment of the present invention, a blender includes a blender base, a container, and a blade base having a blade unit mounted thereon. The blender base includes a motor, a microcontroller, a sensor, and a user interface. The microcontroller is in communication with the motor, and user interface, and can include read only memory, nonvolatile memory, and a central processing unit. The programs with preprogrammed motor commands are stored in the read only memory.

The motor is preferably operable to rotate the blade unit in forward and reverse directions, and to oscillate the blade unit as desired. In a preferred embodiment, the motor is a dual wound motor, but other configurations may be used.

The connection between a shaft for the motor and the blade base may be implemented in a number of ways, but preferably is formed by a male to female connection. In accordance with one aspect of the present invention, both the female and male connection pieces are made of metal. This connection permits a close tolerance fit, as well as a low wear connection. To prevent shock to a user, in accordance with another aspect of the present invention, an insulating bushing is used to isolate the outer surface of the male drive from the metal shaft of the motor. Preferably, the insulating bushing is captured within the male drive member, adding stability and limiting shear stresses in the bushing.

The blender base may be utilized with a number of different components, including a jar having an integral collar, a threaded jar, a single serving beverage container, and a food processor. The jars may include a nonstick coating, such as Teflon. One or more sensors may be present on the blender base to detect the presence of and type of container in which the mixing or processing will take place.

In accordance with another aspect of the present invention, a novel blade unit is provided for a blender. The blade unit enables improved food processing and chopping capabilities. The blade unit is mounted on a blade base, and includes a generally U-shaped blade assembly such as is used in contemporary blenders. In addition, the blade unit includes a second blade assembly that extends substantially radially to the driving axis of the blade unit. In an exemplary embodiment of the present invention, a third blade assembly is provided that is also generally U-shaped. In this exemplary embodiment, the first blade assembly is arranged so that its blades extend upward, and the third blade assembly is arranged so that its blades extend downward. The second, radially-extending blade assembly is sandwiched between the first and third blade assemblies.

A detachment mechanism may be provided that permits a user to easily detach the blade unit from its base. In addition, in accordance with another aspect of the present invention, a cap for the jar is configured so that it fits into the blade base and can be used to remove the blade base from the jar.

In accordance with another aspect of the present invention, a sensor is provided that is arranged and configured to determine strain on the motor. For some routines that are executed by the blender base, if the strain exceeds a threshold, then the microcontroller instructs the motor to reverse directions, permitting dislodging of blocking particles.

Other features and advantages will become apparent from the following detailed description when taken in conjunction with the drawings, in which:

BRIEF DESCRIPTION OF THE DRAWINGS

FIG. 25 shows a routine that may be implemented by the blender base of FIG. 1 to mix powdered drinks;

FIG. 26 shows a routine that may be implemented by the blender base of FIG. 1 to make batter;

FIG. 27 shows a routine that may be implemented by the blender base of FIG. 1 to form a milkshake;

FIG. 28 shows an example of a user interface that may be used on the blender base of FIG. 1;

FIG. 29 shows a second example of a user interface that may be used on the blender base of FIG. 1;

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Figure 1:
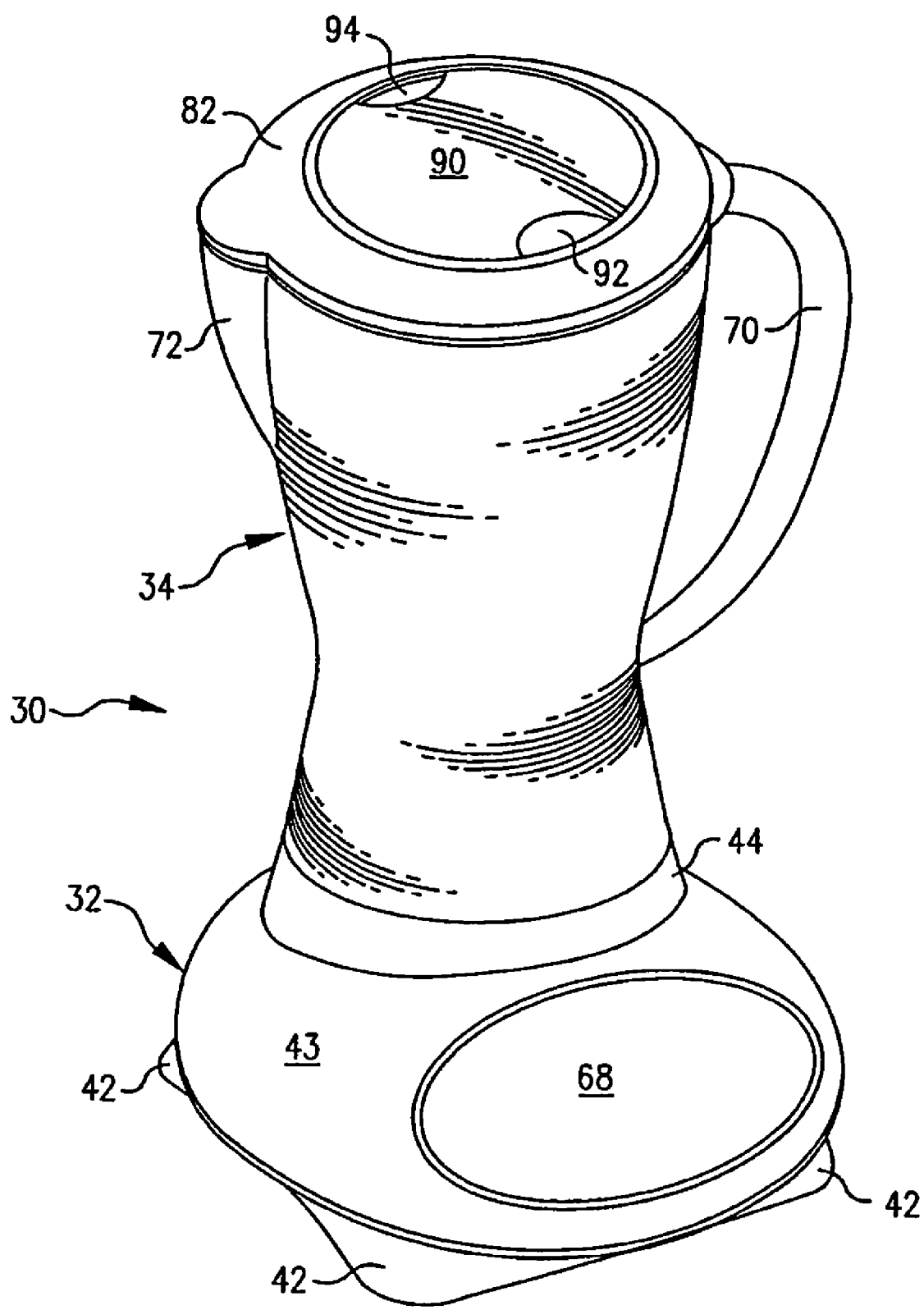
FIG. 1 is a front, left, perspective view of a blender base and container incorporating the present invention.
Figure 2:
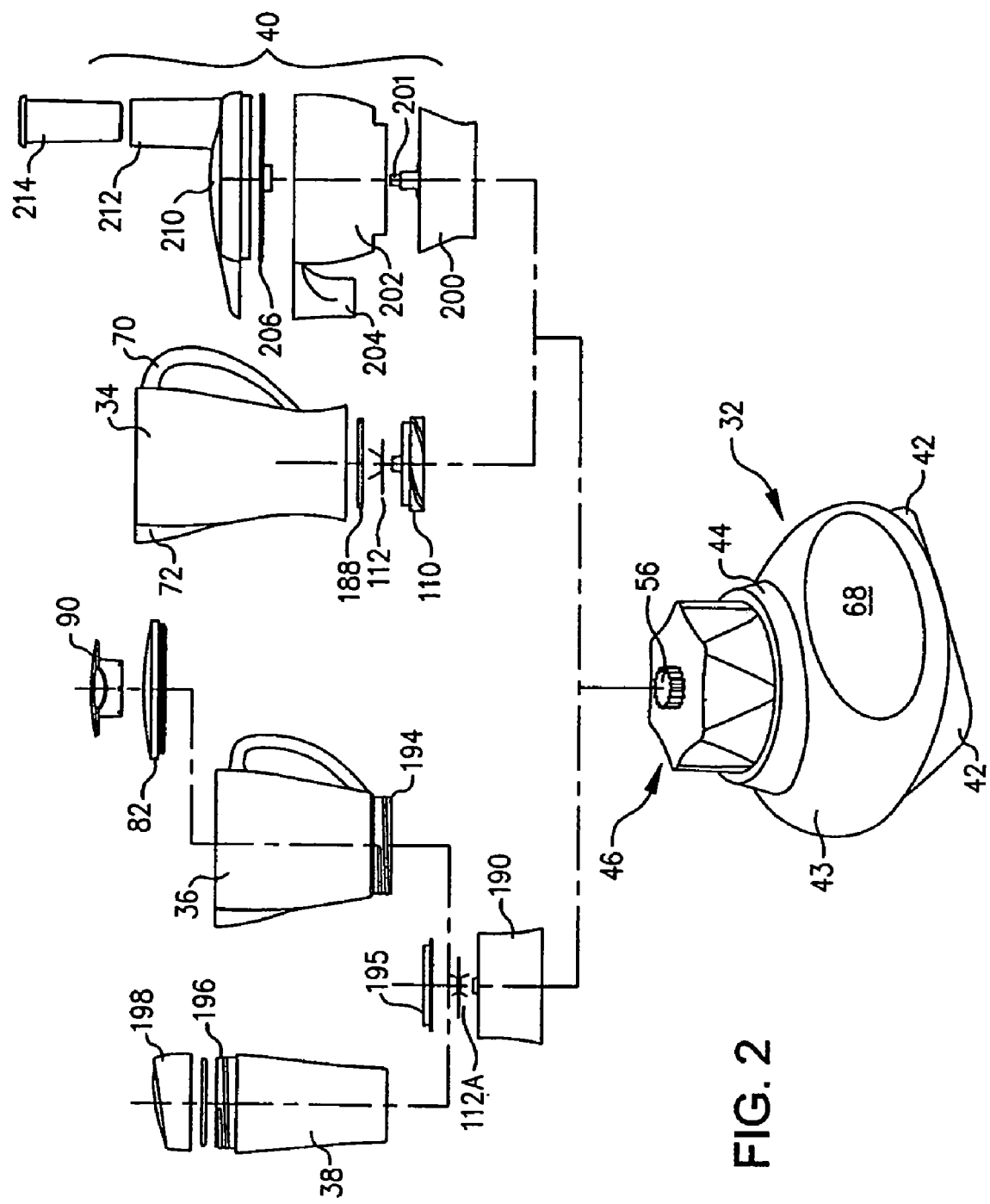
FIG. 2 is an exploded perspective view showing a number of components that may be attached to the blender base of FIG. 1.

Referring now to the drawing, in which like reference numerals represent like parts throughout the several views, FIG. 1 shows a blender 30 incorporating many features of the present invention. Briefly described, in accordance with one aspect of the invention and as is best shown in FIG. 2, the blender 30 includes a blender base 32 that may be utilized with a number of different components, including a jar 34 having an integral collar (hereinafter "collared jar 34"), a threaded jar 36, a single serving beverage container 38, and a food processor 40. As subsequently described, the blender base 32 is preprogrammed with a plurality of routines designed for particular food or drink items, for example, by taking a particular sequence of motor commands (e.g., direction of rotation, speed, duration or time of rotation, etc.) which are automatically implemented based on the function (e.g., end result) selected by the user. Additionally, sensors may be present on the apparatus of the present invention to detect the presence of and type of container in which the mixing or processing will take place. Other novel features of the present invention will become apparent below.

Figure 3:
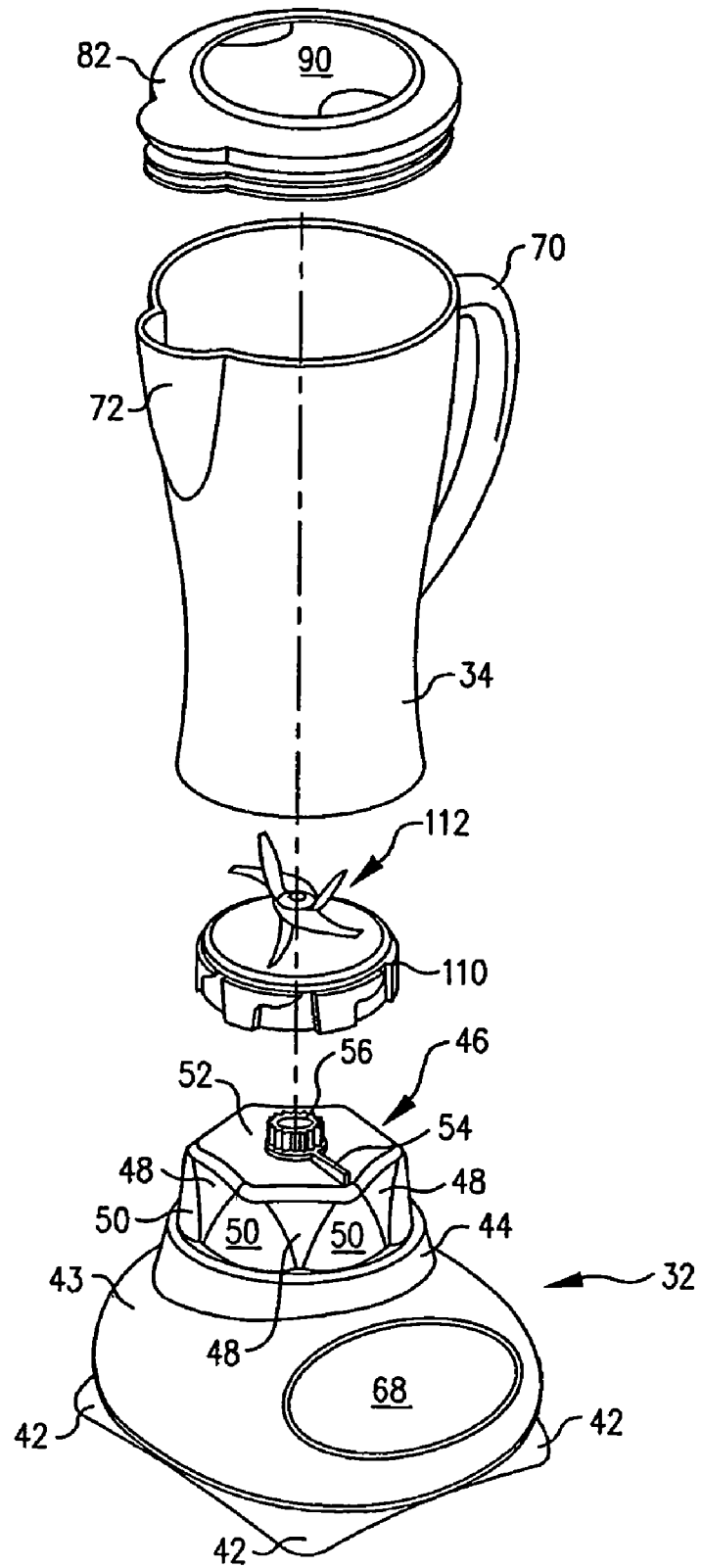
FIG. 3 is an exploded perspective view of the blender base and blender container of FIG. 1, showing a blade base that connects to the blender base.

Turning now to FIG. 3, the blender base 32 includes four feet 42 for placing the blender base on a surface such as a table. Rounded, tapered sides 43 lead to an attachment base 44. An attachment protrusion 46 is mounted on the top of the attachment base 44, and includes tapered sides having alternating triangular-shaped concave surfaces 48 and convex surfaces 50 (detail is further shown in FIG. 4). The upper outer shell of the blender base 32 may be extruded as a single piece of plastic, or alternatively may be cast as several pieces and assembled. In addition, the blender base may be formed of other suitable materials, such as metal, for example.

Figure 4:
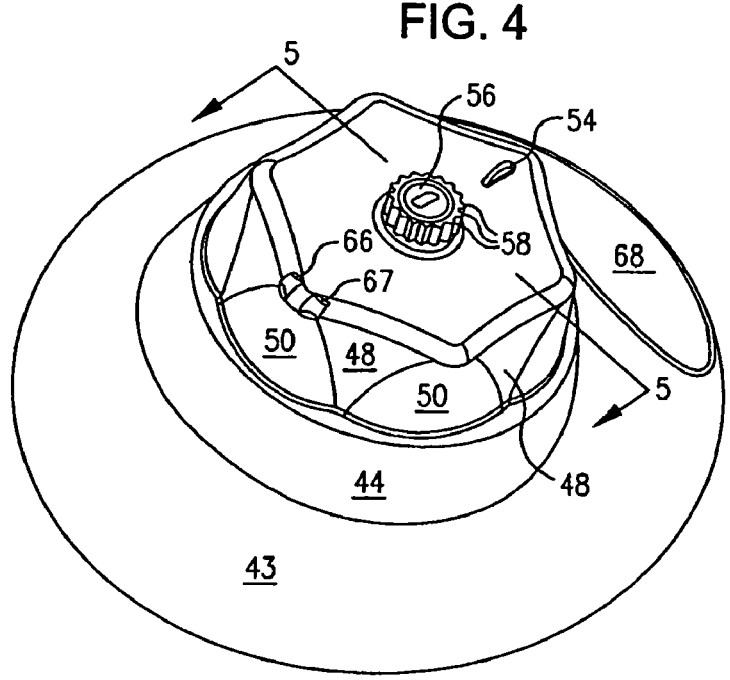
FIG. 4 is a back, left perspective view of the blender base of FIG. 1.

The concave surfaces 48 are configured so that their bases are at the top of the attachment protrusion, whereas the convex surfaces 50 are configured so that their bases are at the bottom. The top 52 of the attachment protrusion 46 is flat, and includes a rotation lock 54 and a male drive element 56. The rotation lock 54 is preferably a male protrusion shaped like a fin. The male drive element 56 is shaped like a gear and includes a number of teeth 58 (FIG. 4). In the embodiment shown, there are 16 teeth, but the male drive element 56 may be designed to have any number of teeth as appropriate.

Figure 5:
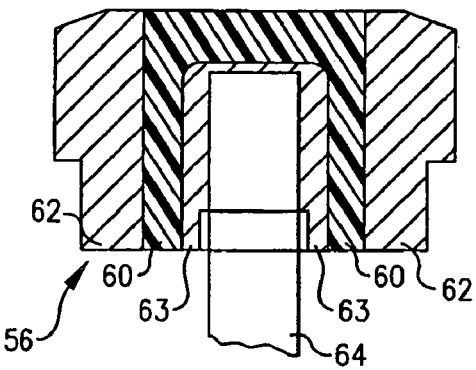
FIG. 5 is a cutaway view taken along the line 5-5 of FIG. 4.

The male drive element 56 is preferably formed of metal, and, as is subsequently described, a corresponding female drive element for containers that are attached to the blender base is also preferably metal. The metal-to-metal contact ensures limited wear, a close tolerance fitting, and reduces the likelihood of broken parts. However, one problem that may be encountered with a metal-to-metal connection is that, if an electrical motor is used, a user may experience shock from voltage flowing through the male drive element 56. To alleviate this problem, as can be seen in FIG. 5, the present invention utilizes an insulating bushing 60 to insulate the male drive element 56 from a motor shaft 64. To do so, the male drive element includes an outer ring 62 and an inner metal attachment 63. The teeth 58 are mounted on the outside of the outer ring 62. The inner metal attachment 63 fits onto the motor shaft 64. The insulating bushing 60 is preferably formed of rubber, although any insulating material may be used.

The insulating bushing 60 is designed and arranged so that it fits fully inside the outer ring 62. In addition, the metal attachment 63 is preferably designed and configured so that the metal attachment fits fully within the bushing 60. This structure offers maximal stability, in that most shear stresses applied by the motor shaft 64 may be uniformly transferred to the outer ring 62 through the bushing 60. Thus, a shear along the length of the bushing (i.e., top to bottom in FIG. 5) does not occur. Although variations of this structure may be used, it is preferred that the metal attachment 64 be at least partially surrounded by the outer ring 62, so that the outer ring and metal attachment's stiff structures may provide stability for the bushing 60, and so that shear forces in the bushing may be minimized.

A pair of first and second sensor switches 66, 67 (FIG. 4) are included at the junction of the top 52 and the convex and concave surfaces 48, 50, the function of which is subsequently described. In the embodiment of the blender base 32 shown in the drawings, the first and second sensor switches 66, 67 are mounted on opposite side of the apex of one of the convex surfaces 50.

A user interface panel 68 is mounted on the front of the rounded, tapered sides 43. As described below, various user interfaces may be displayed on the user interface panel 68.

The blender base 32 is shown in FIGS. 1 and 3 with the collared jar 34. However, as described above, the blender base 32 may be used with any number of different blending or processing units that may serve different or overlapping functions. In general, each blending or processing unit that is to be used with the blender base 32 includes a container and a blade assembly of some kind. The blender base 32 includes a drive mechanism and attachment method that allows the blender to be used with the different containers. As described subsequently, this container flexibility even allows the blender base 32 to operate purely as a food processor, if desired.

The collared jar 34 is one example of a container that may be used with the blender base 32. The collared jar 34 is preferably generally cylindrical in shape, and includes a handle 70 and a pouring spout 72. The cylindrical shape promotes better mixing and minimizes accumulation of food or materials that may occur in containers having cross sectional areas with edges or corners. However, other shapes for the container may be used.

The collared jar 34 can be made from glass, plastic, metal, or any other suitable, nontoxic material which can resist high stress. Additionally, the inside of collared jar 34 may be coated with non-stick coating such as Teflon® and the like to allow for better mixing or easier cleaning.

The sides of the collared jar 34 taper outward from a location just below the bottom juncture of the handle 70 and the sides, to both the open top of the collared jar and the open bottom. The upper, tapered, shape promotes good blending and processing of items in the collared jar 34, because it promotes flow of the items downward to the bottom of the collared jar.

Figure 6:
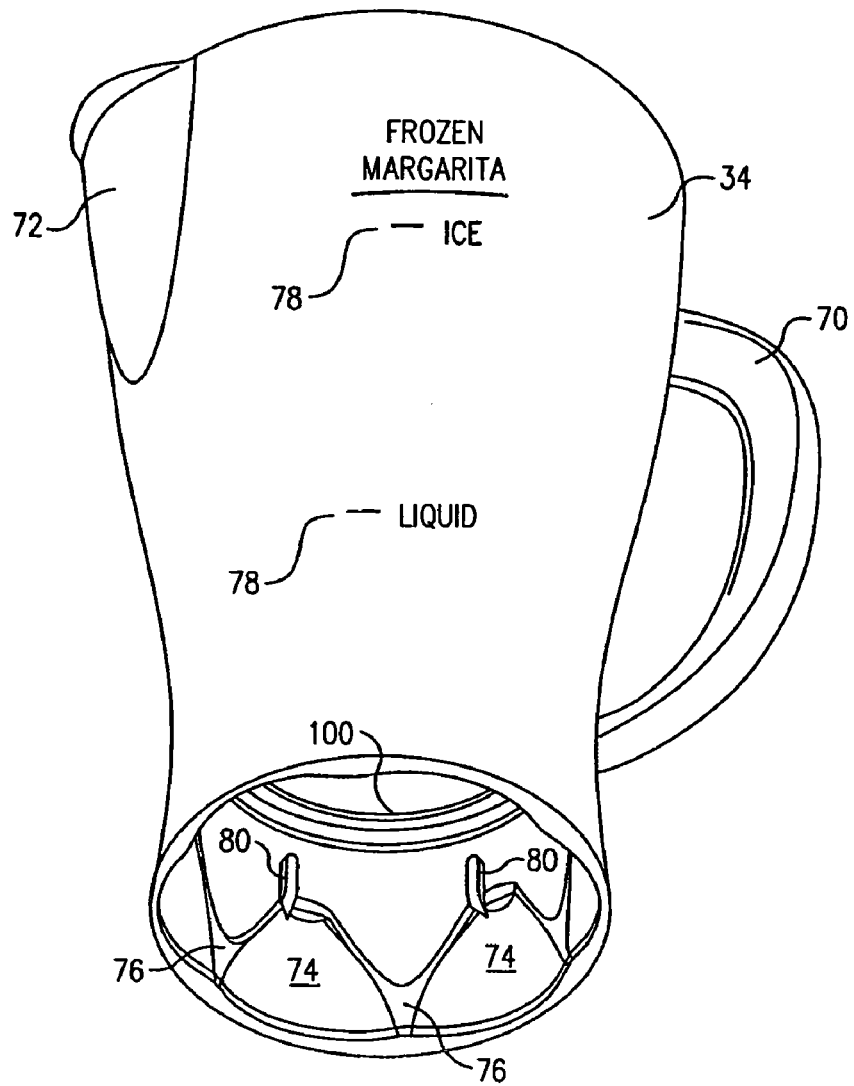
FIG. 6 is a bottom perspective view of a jar for the blender container of FIG. 1.

The bottom end of the collared jar 34 is opened so that it fits over the attachment protrusion 46 of the blender base 32. In this manner, the bottom end of the collared jar 34 serves as a collar that fits over the attachment protrusion 46 of the blender base 32. As can be seen in FIG. 6, the lower inside of the collared jar 34 includes a scalloped surface. The scalloped surface includes a series of concave triangular sections 74 connected at their bases, with the bases extending along the bottom edge of the collared jar 34. Flat surfaces 76 extend between the areas defined between the concave triangular sections 74. The concave triangular sections 74 and the flat surfaces 76 are arranged and configured so that when the collared jar 34 is fitted onto the attachment protrusion 46 of the blender base 32, the concave triangular sections 74 fit over and against the convex surfaces 50 of the rectangular protrusion, and the flat surfaces 76 fit against the concave surfaces 48 of the attachment protrusion. In this manner, the collared jar 34 does not rotate when placed on the attachment protrusion 46 of the blender base 32.

Markings 78 (FIG. 6 only) indicating various ingredient levels for recipes may be placed onto the collared jar 34 to assist the user. For example, there may be markings 78 on the collared jar 34 to illustrate the proper amounts of ice and liquid to use for making a particular drink (e.g., a frozen margarita). Such markings 78 can be a permanent, such as by etching or embossing the markings on the collared jar 78. Alternatively, the markings 78 may be removable (e.g., removable stickers) that are included with the collared jar 34, or that are supplied separately to a user (e.g., with a recipe mix or the like).

A series of switch activators 80 (FIG. 6) are included on the inside surface of the collared jar 34. The switch activators 80 are male protrusions that are located just to one side of the junction of the concave triangular sections 74 and the flat surfaces 76 and are aligned and configured so that one of the switch activators abuts and engages the second sensor switch 67 so the second sensor switch 67 is depressed when the collared jar is pressed into position against the attachment protrusion 46 of the blender base 32. By providing switch activators 80 at each of these junctures, one of the switch activators is arranged to engage and depress the second sensor switch 67 upon placing the collared jar 34 onto the attachment protrusion 46 of the blender base 32, regardless of how the collared jar is rotated relative to the blender base. The function of depressing the second sensor switch 67 is described further below.

Figure 7:
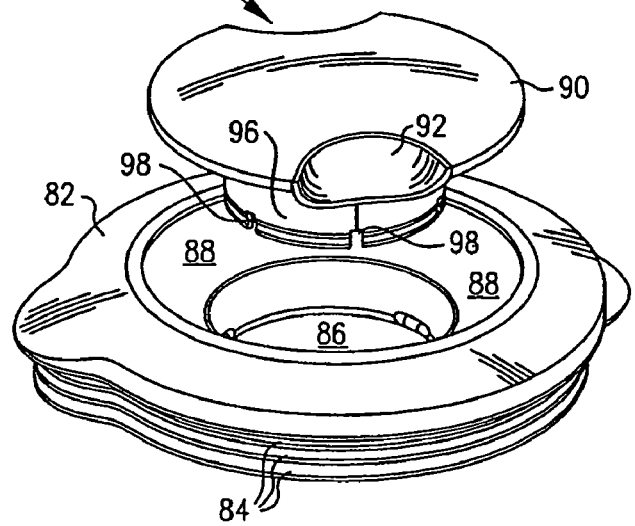
FIG. 7 is an exploded perspective view of a lid and cap assembly for use with blender container of FIG. 1.

A lid 82 (FIG. 3) is provided that fits over the upper opening of the collared jar 34. As can best be seen in FIG. 7, the lid 82 includes flanges 84, made of rubber, TPE, or another suitable material, at a bottom edge for snuggly fitting into the upper opening of the collared jar 34. A central hole 86 extends through the center of the lid 82 and includes tapered outer edges 88. The central hole 86 provides a receptacle through which ingredients, such as ice or liquids, may be added to the collared jar 34.

A removable cap 90 fits into the central hole 86. The removable cap 90 includes finger grips 92, 94 at top, outer edges, for gripping the cap and removing it from the central hole 86. A cylindrical extension 96 extends out of the bottom of the cap 90. The cylindrical extension 96 fits snugly into, and closes the central hole 86 in the lid 82 when the cap 90 is placed in the lid. The cylindrical extension 96 includes a series of notches 98 evenly spaced along its bottom edge, the function of which is described below.

An abutment surface 100 (FIG. 6) is provided above the scalloped inner surface of the collared jar 34, and is arranged to abut against a top surface 102 (FIG. 8) of a blade base 110. When inserted onto the collared jar 34, the blade base 110 forms a sealed bottom for the collared jar, and the two elements form an opened-top container. Although described as being removably attachable (i.e., by threads) to the collared jar, the blade base 90 may be permanently or removably attached to the bottom of the collared jar 34 or another container. However, providing a removable blade base 110 permits easier cleaning of the blender 30.

The blade base 110 includes a novel blade unit 112 that enables the blender 30 to have improved food-processing capabilities. The blade unit 112 may include any number of blades, but preferably includes at least one generally U-shaped blade assembly such as is used in contemporary blenders. In addition, the blade unit 112 includes a second blade assembly that extends substantially radially relative to the rotational axis of the blade unit.

Figure 8:
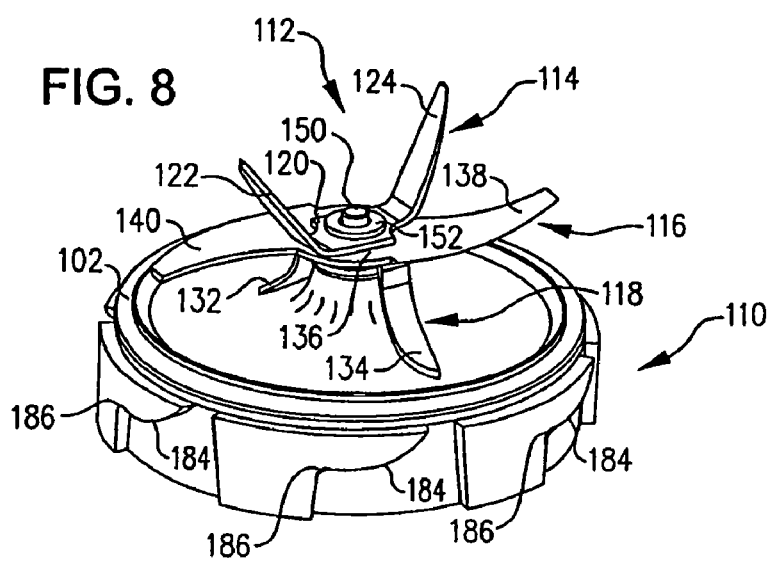
FIG. 8 is a perspective view of the blade base and blade unit shown in FIG. 3.

The blade unit 112, as shown in an exemplary embodiment in FIG. 8, includes a top or first blade assembly 114, a middle or second blade assembly 116, and a third or bottom blade assembly 118. The blade assemblies 114, 116, 118 may be made of any durable material such as metal, steel, carbon, etc. which can be sharpened and withstand high stress and heat.

Figure 9:
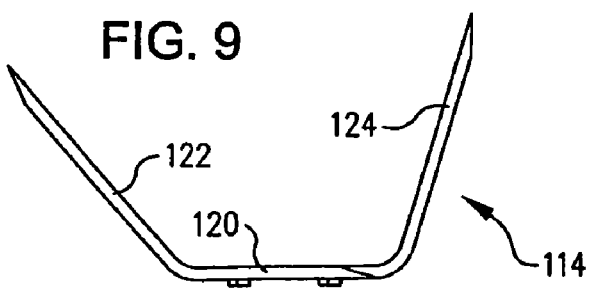
FIG. 9 is a side view of the top blade for the blade unit shown in FIG. 8.

The top blade assembly 114 and the bottom blade assembly 118 are preferably similar to conventional blender blade designs (i.e., one or more generally U-shaped blades). In particular, as shown in FIG. 9, the top blade assembly 114 includes a central, substantially flat base 120 that extends generally radially with respect to the rotational axis of the blade unit 112. A first blade 122 extends at a first angle upward from the base 120, and a second blade 124 extends at a second angle from the base. Providing the two blades 122, 124 at different angles from the base provides enhanced blending and processing. Preferably, the blades 122, 124 are formed integrally with the base 120.

Figure 10:
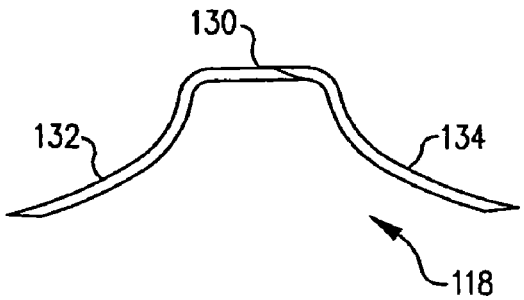
FIG. 10 is a side view of the bottom blade for the blade unit shown in FIG. 8.

The bottom blade assembly 118 (FIG. 10) also includes a base 130 that extends generally radially with respect to the rotational axis of the blade unit 112. First and second curved blades 132, 134 are preferably formed integral with the base 130, and extend downward and outward from the ends of the base 130. The curved shape of the blades enhances blending and processing, and permits the edges of the blades to extend to adjacent the bottom of the container formed by the collared jar 34 and the blade unit 112. In this manner, blended and processed items are dislodged and forced upward from the bottom of the container.

Figure 11:
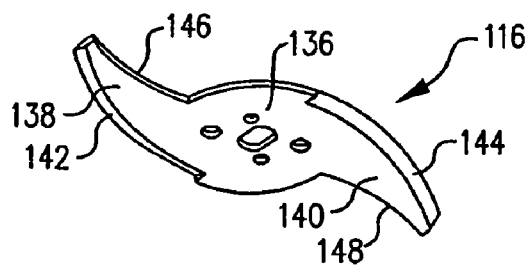
FIG. 11 is a top view of the middle blade for the blade unit shown in FIG. 8.

The middle blade assembly 116 has, for example, a food processor blade design (i.e., one or more blades that extend generally radially from the rotational axis of the blade unit 112). In an exemplary embodiment shown in FIG. 11, the middle blade assembly 116 includes a central base 136 and first and second blades 138, 140. The blades 138, 140 are coplanar with the base 136 and are curved, but may be straight in alternate embodiments. The central base 136 and the first and second blades 138, 140 are preferably integrally formed, but may be formed as separate elements. In addition, the two blades 138, 140 may be provide on alternate bases, and may be spaced axially from one another so that they are not located in the same plane.

As subsequently described, the blender base 32 is preferably designed so that the blade unit 112 may be rotated in forward and backward directions, and/or may be oscillated. If a reverse function is provided, the blades 122, 124, 132, 134, 138, 140 may be sharpened on leading edges, and blunt on opposite edges, or may be sharpened on both (i.e., opposite) edges. In addition, if desired, one or more of the blades may be provided with different sharpened surface, such as a serrated edge, to enhance or change the cutting of the blades. For example, for the embodiment of the middle blade assembly 116 shown in FIG. 11, the blades 138, 140 include sharpened leading edges 142, 144, and blunt trailing edges 146, 148. As defined herein, the leading edges are the edges that are forward (i.e., hit the blended items first) when the blade unit is traveling in the forward direction. The trailing edges are the rearmost (i.e., hit the blended items last) parts of the blades when the blades travel in the forward direction. Providing a blunt edge on the trailing end has been found to enhance mixing when the blade unit is rotated in a reverse direction, whereas sharpening both edges has been found to increase the cutting action of the blades and blending when rotated in the reverse direction or oscillated.

The middle blade assembly 116 is sandwiched between the top blade assembly 114 and the bottom blade assembly 118, and the three blade assemblies are mounted on an upwardly extending rotational shaft 150. As subsequently described, when the blade unit 112 and collared jar 34 are placed on the blender base 32, the shaft 150 is rotated by the blender base 32, which in turn rotates the combined blade unit 112.

It has been discovered that including a food processor design blade (e.g., the middle blade assembly 116) in combination with one or two conventional blender design blades (e.g., the top blade assembly 114 and the bottom blade assembly 118) enables the blender 30 to have superior chopping, cutting, and slicing capabilities. Specifically, the food processor design blade often comes into contact with items that are missed by conventional blender design blades. In addition, for those items that are contacted, the food processor design blade hits them more directly, most likely because the blade is not at an angle with respect to the axis of rotation of the blade unit 112. The blade assemblies may be spaced differently than they are spaced in the shown embodiment, but it has been found that locating the blade assemblies adjacent to one another in the sandwiched configuration provides these enhanced cutting features, and provides the least amount of interference for placing into the container items that are to be blended.

Figure 13:
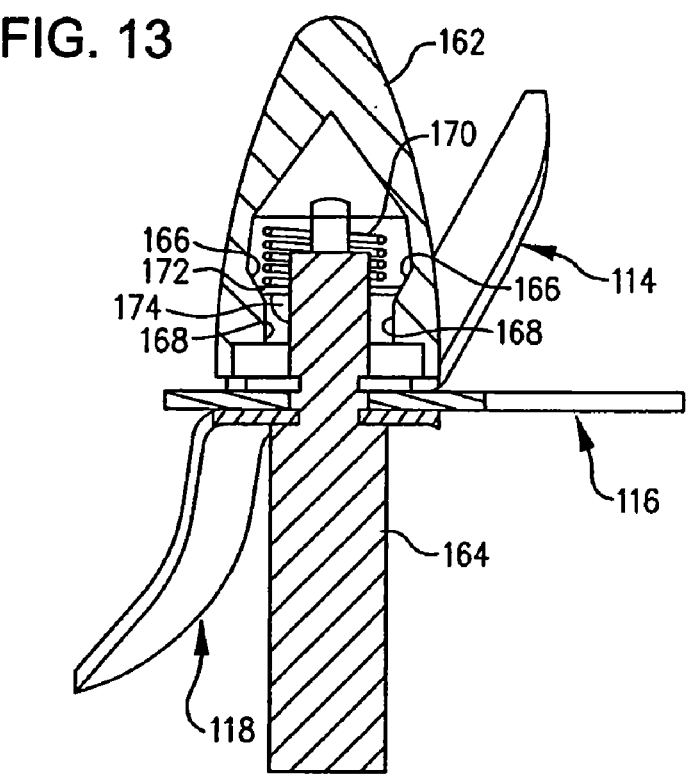
FIG. 13 is a cutaway view of the extraction mechanism of FIG. 12, with the extraction mechanism shown in a released position.
Figure 14:
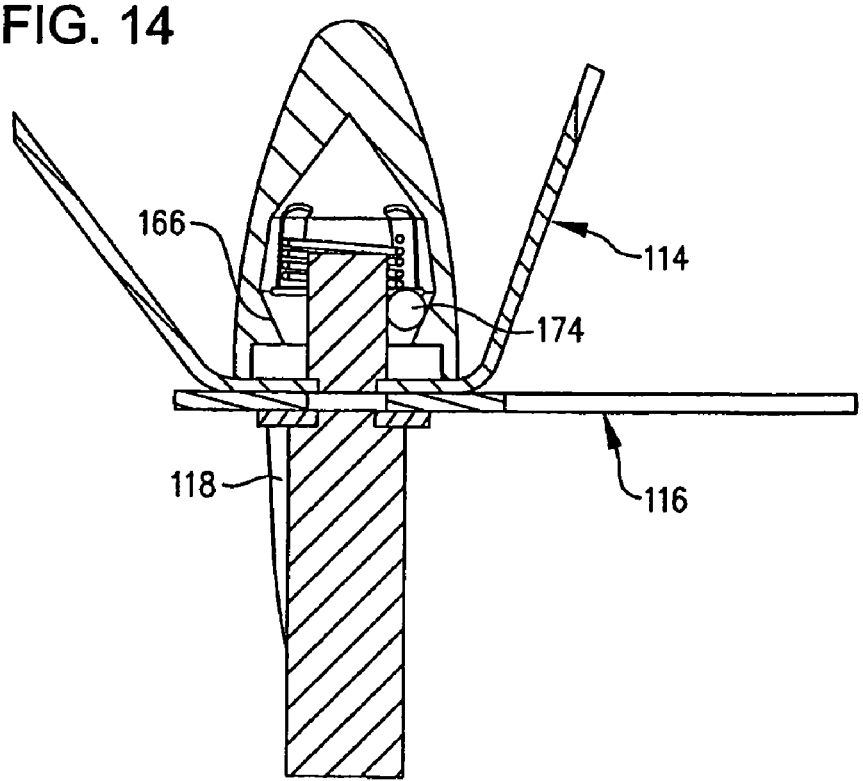
FIG. 14 is a cutaway view of the extraction mechanism of FIG. 12, with the extraction mechanism shown in a locked position.

The blade unit 112 may be permanently or removably attached to the blade base 110, and in one embodiment is riveted to the shaft 150 with a washer 152 (FIG. 8). For example, the end of the shaft may be deformed using an orbital riveting process to lock the blade unit in place, and the washer may be used to help hold the blade unit in place. In an alternate embodiment shown in FIGS. 12-14, the blade unit 112 may include an optional extraction mechanism 160 that allows a user to disengage blade unit 112 from blade base 110. By removing the blade unit 112, the container formed by the blade base 110 and the collared jar 34 may serve as a pitcher, and the blade unit 112 may be easier to clean.

Figure 12:
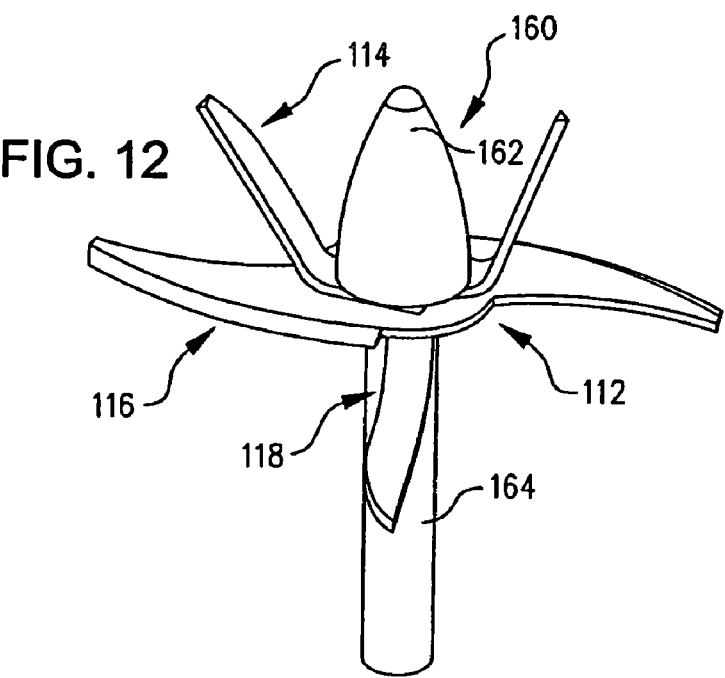
FIG. 12 is a perspective view of a blade unit utilizing an extraction mechanism in accordance with one aspect of the present invention.

In an exemplary embodiment shown in FIG. 12, the extraction mechanism 160 comprises a conical-shaped cap 162 that snaps over a rotation shaft 164 for the blade unit 112. The conical-shaped cap 162 may be made of rubber, plastic, or any other suitable nontoxic material. The conical-shaped cap 162 includes a hollow interior (FIG. 13) having a lower, tapered surface 166 that extends downward to a narrowed, flat portion 168 at its lower surface. A spring 170 is mounted inside the upper end of the conical-shaped cap 162, and is arranged to push downward on a washer 172. A ball bearing 174 (or alternatively, a plurality of ball bearings) is captured inside the conical-shaped cap 162 and below the washer 172.

To attach the extraction mechanism 160, the cap 162 is pressed onto the shaft 164. As the cap 162 is pressed downward, the ball bearing 174 or bearings are wedged between the tapered surface 166 and the shaft 164 (FIG. 12). The spring 170 maintains the ball bearing 174 in this position, and the friction caused by the pressure of the spring 170 pressing the ball bearing against the shaft keeps the cap 162 in place. If upward pressure is placed on the cap 162, for example by the blade unit 112 or by a user trying to pull up on the cap, the ball bearing 174 is further driven into the shaft 164 by the relationship of the tapered surface 166 and the shaft.

To remove the cap 162, a user may press inward on the sides of the cap (FIG. 14), which drives the washer 172 up the tapered surface 166 against the force of the spring. This movement releases the tension placed on the ball bearing 174, allowing it to roll freely into the space defined by the tapered surface 166, the washer 172, and the shaft 164. With the pressure and friction of the ball bearing 174 removed from the shaft 164, the user may then easily remove the cap 162 from the shaft.

Other extraction mechanisms may be used. For example, a pair of lock nuts may be used. However, an advantage of the described extraction mechanism 160 is that it does not require tools for a user to remove the blade unit 112.

Figure 15:
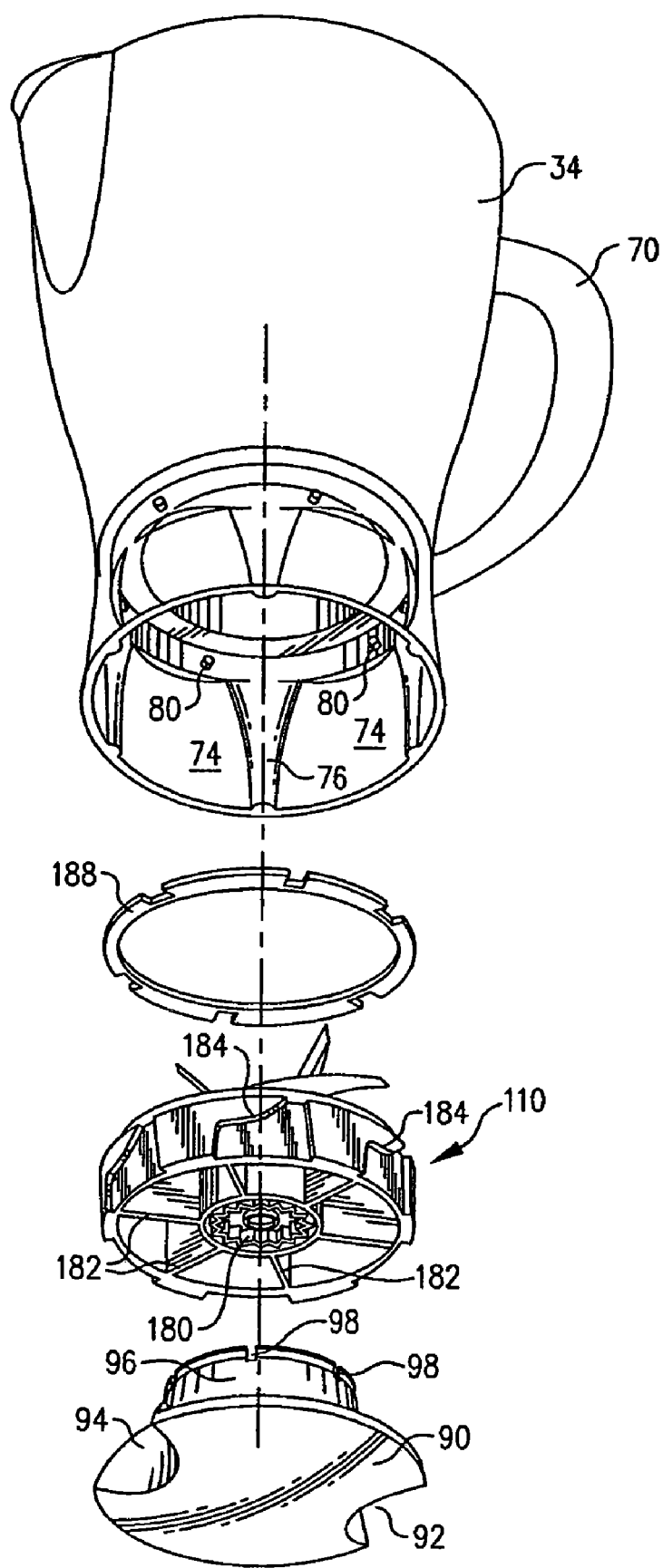
FIG. 15 is a bottom exploded perspective view of the blender container of FIG. 1, with the cap of FIG. 7 shown aligned with the blade base.
Figure 16:
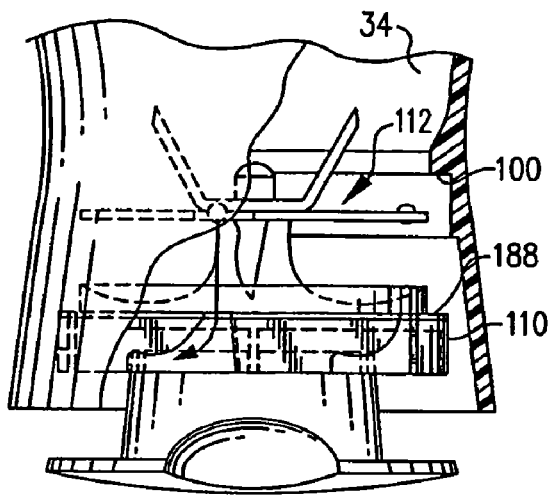
FIG. 16 is a partial cutaway of the bottom of the blender jar of FIG. 1, showing a beginning step of inserting the blade base with the cap.

As can be seen in FIG. 15, the bottom side of the blade base 110 includes a female connector 180 that is designed to fit on the male drive element 56. The female connector 180 is preferably formed of metal, so the male drive element 56 and the female connector may utilize a metal-to-metal connection as described above. The female connector 180 is rotatably mounted in the blade base 110 and is fixed to rotate with the shaft 150 (FIG. 8). The bottom side of the blade base 110 also includes radially-extending ribs 182.

The outer circumference of the blade base 110 includes a series of evenly spaced cam surfaces 184 (best shown in FIG. 8). The cam surfaces 184 include an indentation 186.

Figure 17:
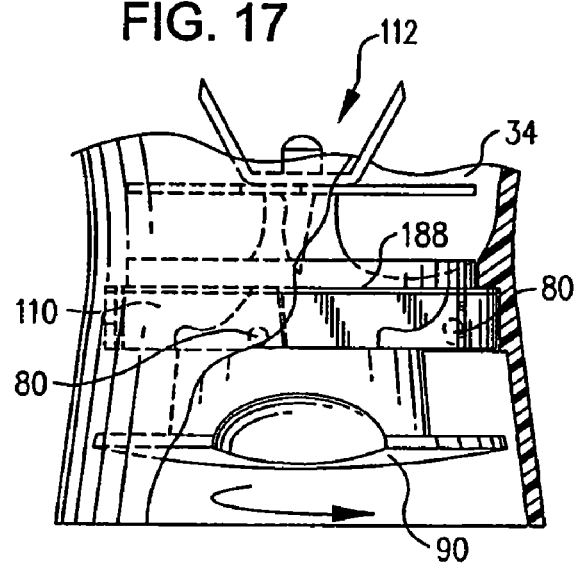
FIG. 17 is a partial cutaway, similar to FIG. 16, showing a further step of inserting the blade base with the cap.
Figure 18:
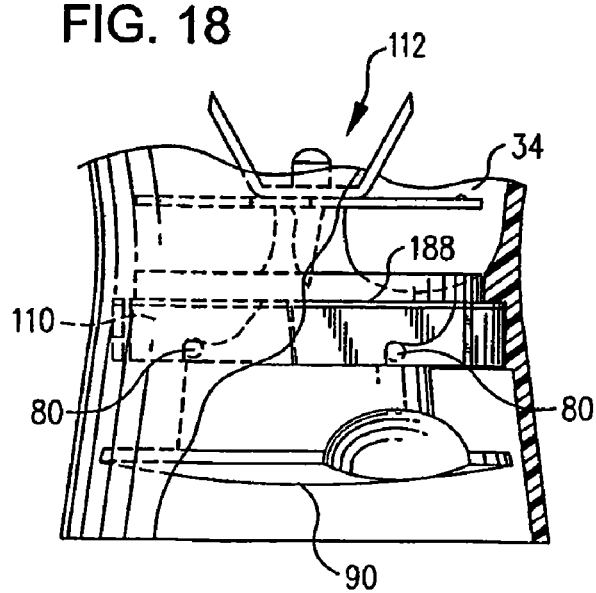
FIG. 18 is a partial cutaway, similar to FIGS. 16 and 17, showing full insertion of the blade base with the cap.

To mount the blade base 110, the blade base is grasped by a user (e.g., by the ribs 182), and is inserted into the bottom of the collared jar 34 until the cam surfaces 184 extend between and beyond the switch actuators 80 on the collared jar and into contact with the abutting surface 100 (FIG. 17). A gasket 188 (FIG. 15), made of rubber or other material, may be utilized to provide a snug fit of the blade base with the abutting surface 100. The blade base 110 is then rotated until the cam surfaces 184 engage the switch actuators 80. As rotation continues, the cam surfaces 184 slide along the top of the switch actuators 80, gradually pressing the blade base 110 against the gasket 188, until the switch actuators 80 are located in the indentations 186. The blade base 110 is now in place, and the indentations prevent accidental disconnection of the blade base from the collared jar. The blade base 110 may be removed by pushing the blade base in (effectively compressing the gasket 188) to remove the switch actuators 80 from the indentations 186, and the blade base is rotated and removed to move the switch actuators to a position where they are free of the cam surfaces 184. The blade base 110 may then be pulled out of the bottom of the collared jar 34.

As shown in an exemplary embodiment in FIGS. 15-18, the cap 90 is designed so that it may be used to disengage and remove the blade base 110 from the collared jar 34. As described earlier, the cap 90 includes notches 98. These notches 98 align with the ribs 182 on the blade base 110 to form a fitted connection for easier disengagement (e.g., by turning) of the blade base 110 from the collared jar 34.

To remove the blade base 110 using the cap 90, the cap is removed from the lid 82 (e.g., by grasping the cap with the finger grips 92, 94). The notches 98 are aligned with and inserted on the ribs 182, and the user presses the cap forward into the bottom of the collared jar 34 (FIG. 16) until the cam surfaces 184 extend between and beyond the switch actuators 80 on the collared jar and into contact with the abutting surface 100 (FIG. 17). The user then rotates the cap 90 and blade base 110 to lock the blade base into position, as described earlier. The cap may be similarly used to remove the blade base 110 from the collared jar 34.

When placed on the blender base 32, one of the ribs 182 on the blade base 110 engages the rotation lock 54. In this manner, the driving action of the male drive element 56 does not rotate the blade base 110 off of the collared jar 34 when the motor rotates the blade unit in a reverse direction.

As an alternative to the blade base 110 and the collared jar 34, an agitator collar 190 (FIG. 2) may be used with the blender base 32. The agitator collar 190 includes essentially the same features as the bottom portion of the collared jar 34 and the blade base 110. That is, the agitator collar 190 includes a blade unit 112A, a female drive member, the scalloped inner surfaces that are found on the lower inside of the collared jar 34, and switch activators. However, in a preferred embodiment, the features of the blade base 110 are formed integrally with the agitator collar 190, as opposed to the connection that is used to attach the blade base 110 to the collared jar 34. In addition, the agitator collar 190 includes internal threads 192 (FIG. 19) at the upper, inside portion of the agitator collar.

The threaded jar 36 (FIG. 2) includes male threads 194 that mate with the internal threads 192 on the agitator collar 190. Otherwise, the threaded jar 36 is configured similarly to the top portion of the collared jar 34. The lid 82 and the cap 90 may be utilized with the threaded jar 36, or another top may be provided. An advantage of the threaded jar 36 is that it may be produced out of a different material than the collared jar 34, providing a user additional versatility. For example, the threaded jar 36 may be formed of glass, wherein the collared jar could be formed of plastic. Another advantage is that the agitator collar 190 may be used with other containers, as described below.

To use the threaded jar 36, the agitator collar 190 is threaded onto the male threads 194, and the combined agitator collar and threaded jar are mounted on the blender base 32. A gasket 195 may be used to assure a snug fit.

The single serving beverage container 38 (FIG. 2) may also be used with the agitator collar 190. To this end, the single serving beverage container 38 includes male threads 196 at an upper end for mating with the internal threads 192 on the agitator collar 190.

Figure 19:
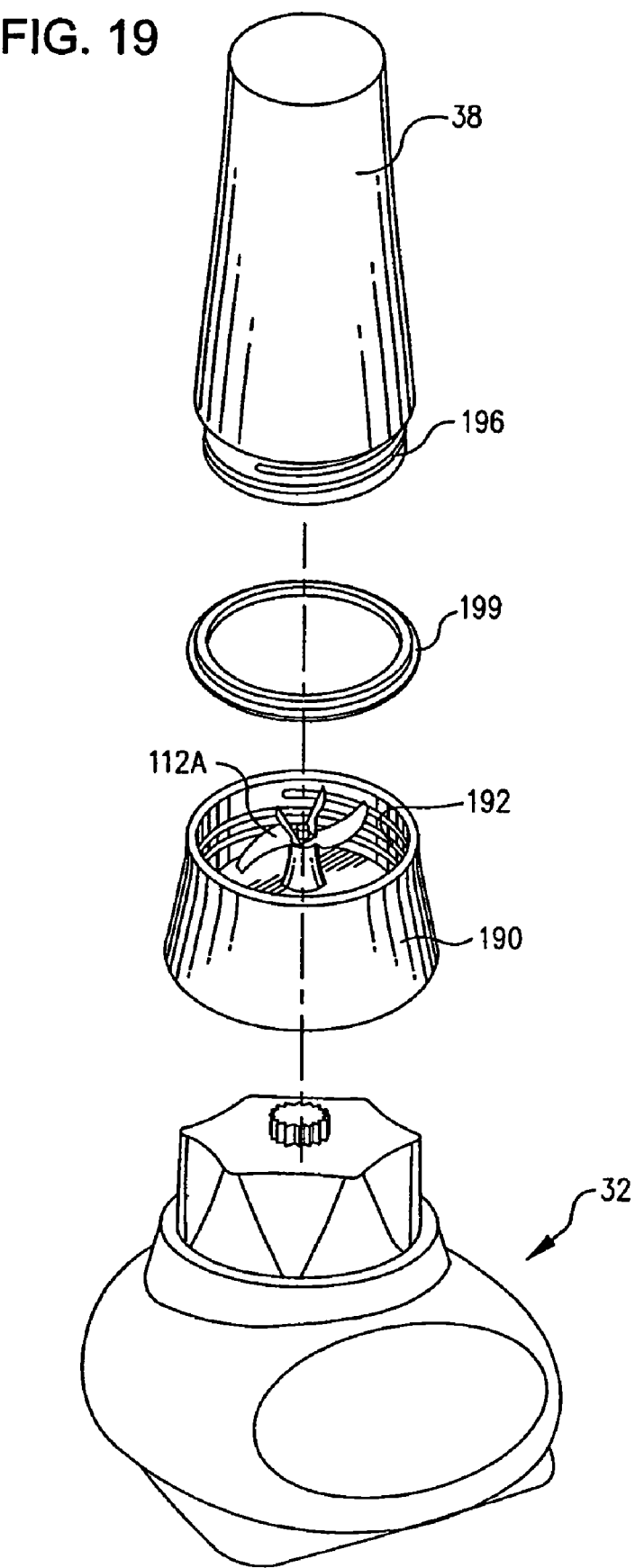
FIG. 19 is an exploded perspective view showing how a single serving beverage container attaches to a collar and fits onto the blender base of FIG. 1.

The single serving beverage container 38 (shown also in FIG. 19 is slightly tapered along its length, and preferably is sized to fit into a user's hand as well as a typical beverage holder in automobiles. A removable cap 198 (FIG. 2) is provided that may be screwed onto the male threads 196. The removable cap 198 may include a drinking hole, and/or may include a closure tab to avoid spillage.

To use the single serving beverage container 38, the cap 198 is removed (if present), and beverage ingredients are placed in the single serving beverage container 38. The agitator collar 190 is then screwed onto the male threads 196. A gasket 199 may be used to assure a snug fit. The single serving beverage container 38 and the agitator collar 190 are then inverted (FIG. 19) and installed on the blender base 32. The beverage ingredients may then be mixed and/or blended by the blender base 32. The agitator collar 190 and the single serving beverage container 38 are then removed, inverted, and the agitator collar is screwed off of the single serving beverage container. The cap 198 may then be screwed onto the single serving beverage container 38, and the single serving beverage container is ready for use.

Figure 20:
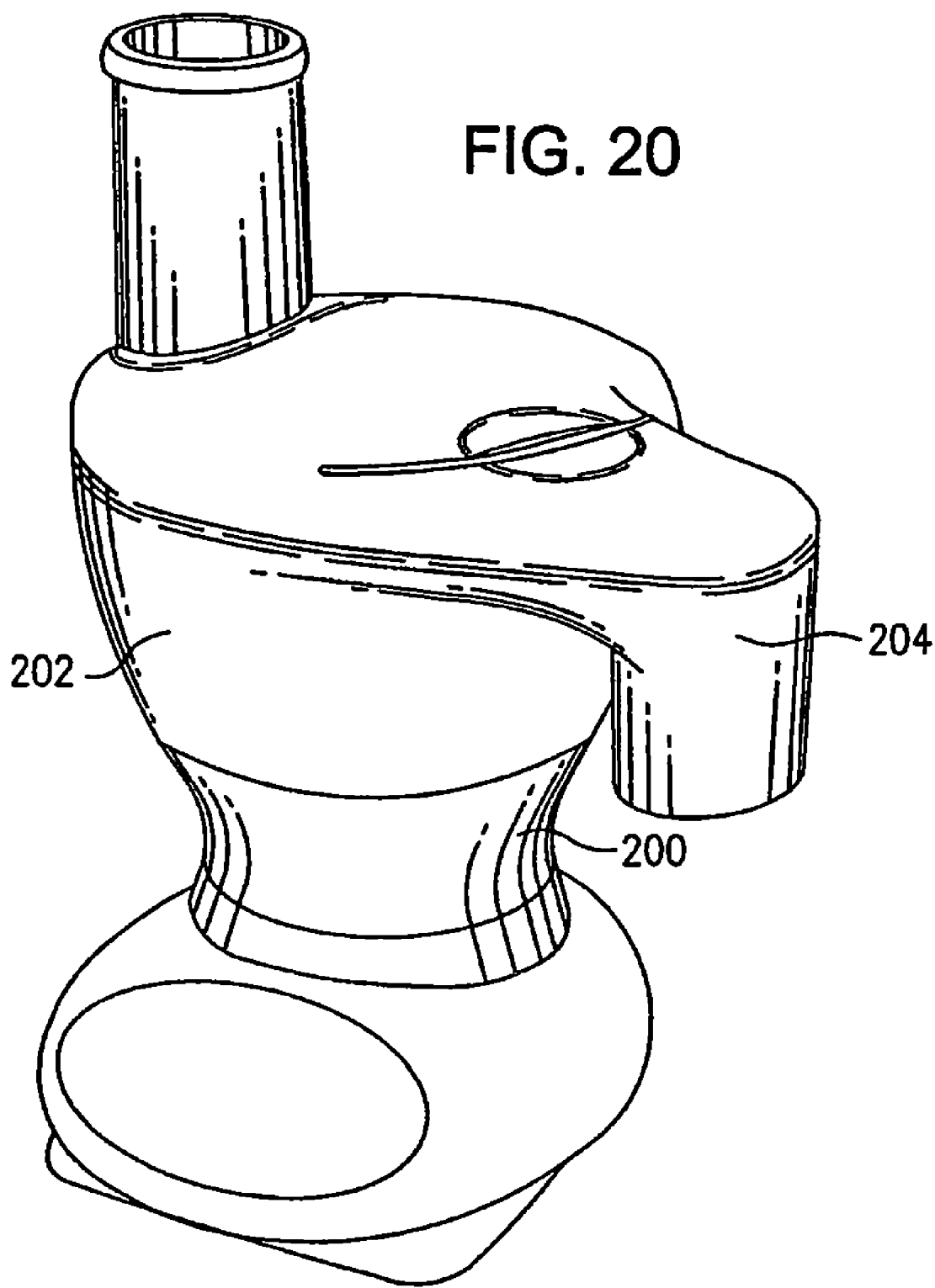
FIG. 20 is a side perspective view showing attachment of a food processor to the blender base of FIG. 1.

The food processor 40 (FIGS. 2 and 20) may also be used with the blender base 32. To this end, the food processor 40 includes a drive collar 200 that is configured much like the agitator collar 190 in that it includes a female drive member, the scalloped inner surfaces that are found on the lower inside of the collared jar 34, and switch activators. However, the drive collar 200 does not include the blade unit 112. Instead, a drive shaft 201 (FIG. 2) extends out of the center of the drive collar 200 and is connected for rotation with the female drive member. In addition, unlike the agitator collar 190, the switch activators on the drive collar 200 are arranged and configured to engage the first sensor switch 66 (whereas the switch actuators 80 on the agitator collar 190 and the collared jar 34 are arranged and configured to engage the second sensor switch 67). The function of this difference is subsequently described.

The remainder of the food processor 40 is of conventional design. The food processor 40 includes a food mixing tub 202 having a chopped food exit chute 204, a mixing and chopping blade 206, and a lid 210. The lid includes an entry port 212. A pressing tool 214 may be included to press food items through the entry port and into contact with the blade 206.

In use, the drive collar 200 is mounted on the blender base 32, and the food tub 202 is placed over the drive shaft 201. The blade 206 is placed on the drive shaft and is connected in a suitable manner. The lid 210 is then placed over the food tub 202. Food may then be inserted and pushed through the entry port 212. If desired, additional blades may be utilized that provide sweeping features so that the processed food may exit the food exit chute 204.

Figure 21:
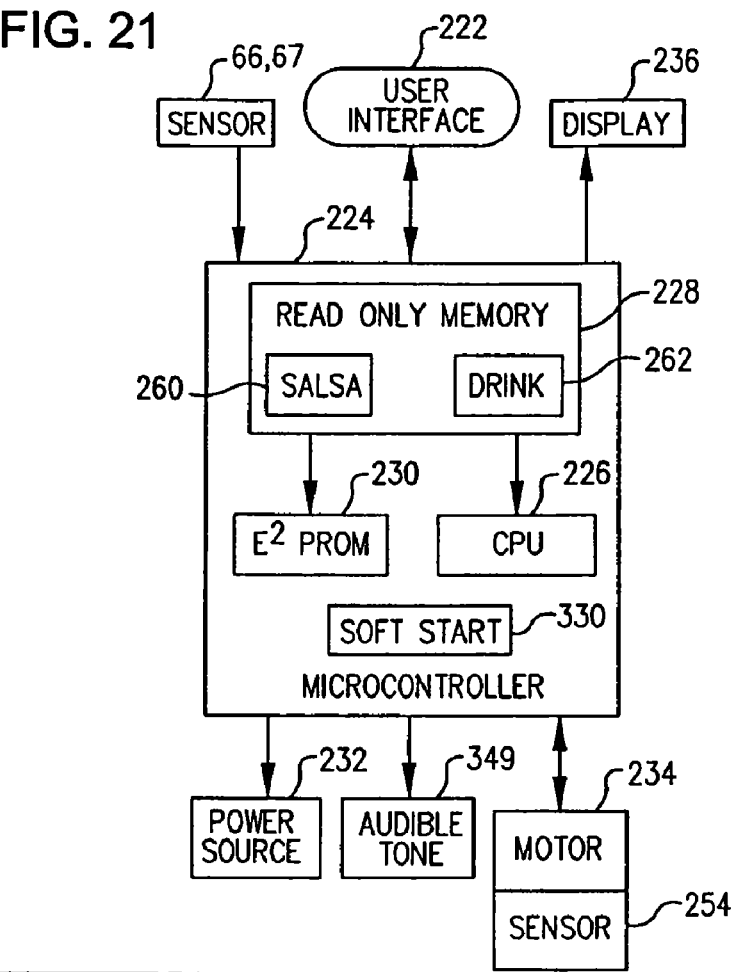
FIG. 21 is a block diagram showing components that may be used to implement the features of the blender base of FIG. 1.

FIG. 21 is a block diagram showing a number of components that may be used for operation of the blender base 32 in accordance with one aspect of the present invention. As described in further detail below, a user interface 222 is provided that allows a user to operate the blender 30 manually and/or select from various preprogrammed functions available. The user interface 222 is connected to a microcontroller 224 which includes, for example, a central processing unit (cpu) 226, a read only memory 228 and a nonvolatile memory 230, such as electronically erasable programmable memory ("$E^2$ PROM"). However, although described with these specific components, the microcontroller 224 may include any software or hardware components that enable it to perform the functions described herein. The microcontroller 224 is connected to or interfaced with a power source 232, a motor 234, and a display 236.

The motor 234 is connected to the shaft 201 and its operation rotates the blade unit 112. The motor 234 may be unidirectional (capable of actuating or rotating the blade unit 3 in one direction only), or bidirectional (capable of actuating or rotating the blade unit 112 in either direction). The motor 234 may additionally be capable of oscillating the blade unit 112.

Figure 22:
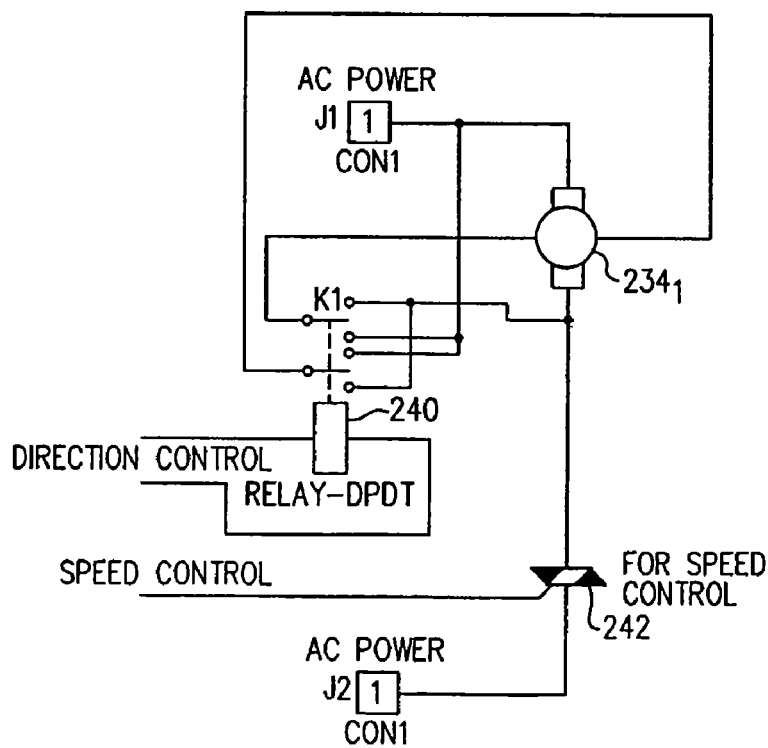
FIG. 22 is a simplified circuit diagram for a motor that may be used with the blender base of FIG. 1.

A simplified circuit diagram for one embodiment of a motor $234_1$ that may be used with the blender base 32 is shown in FIG. 22. The motor $234_1$ has a single wound field, and thus typically has only two leads. To reverse the motor $234_1$, additional leads are provided from the motor that separate the winding of the motor from the rotor of the motor. Once separated, reversing the wires on the rotor reverses the motor. The circuit shown in FIG. 22 utilizes a double pole double throw (DPDT) relay 240 to accomplish this function, and a triac 242 is used to for speed control.

Figure 23:
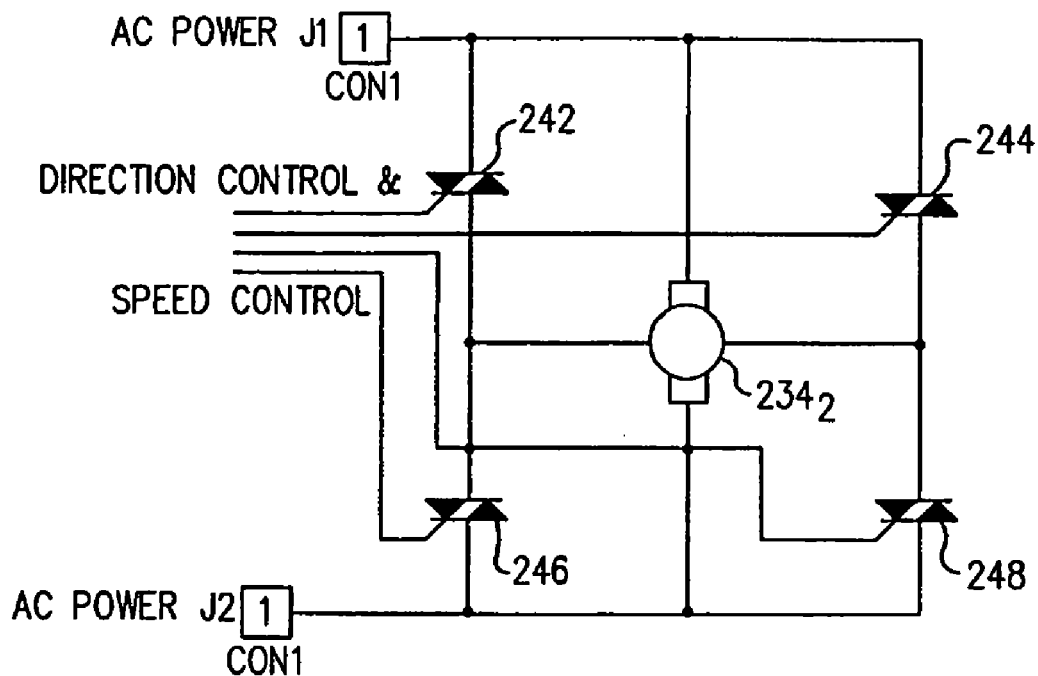
FIG. 23 is a simplified circuit diagram for another motor that may be used with the blender base of FIG. 1.

An alternative circuit for another single wound motor $234_2$ is shown in FIG. 23. Instead of the DPDT relay 240 and the triac 242, the single wound motor $234_2$ in FIG. 23 utilizes four triacs 242, 244, 246, and 248 to accomplish direction and speed control.

Although the single wound motors $234_1$, $234_2$, and related circuits work well for their intended purpose, a problem with using the single wound motors is complexity and cost of the switches.

Figure 24:
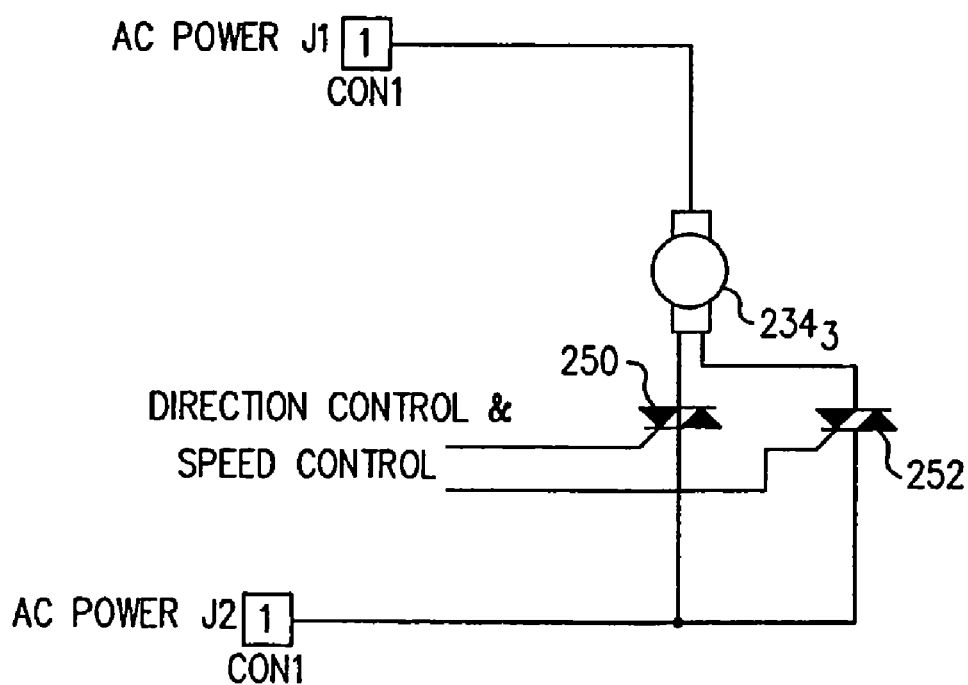
FIG. 24 is a simplified circuit diagram for yet another motor that may be used with the blender base of FIG. 1.

To overcome this problem, a double wound motor $234_3$ (FIG. 24) may be used for the blender base 32. Dual wound motors differ in that they have two separate windings on the field, one powered for the forward direction, and the other powered for reverse. The additional winding is of nominal cost, and only two triacs 250, 252 have to be used in the design, one for forward, and one for reverse. The control is greatly simplified.

The motor 234 may also include a sensor 254 (FIG. 23). The sensor 254 is configured to provide the microcontroller 224 with information regarding the strain placed on the motor during operation. The sensor may, for example, utilize a hall effect sensor and a magnet to make a simple tachometer to measure the speed, and then compare the actual speed to known values to determine if the motor is operating in a legitimate portion of the torque-speed curve such that the motor can cool itself. The sensor 254 sends a signal to the microcontroller 224 if the motor is not operating in this portion. The microprocessor 224 may use this information to alter a routine being operated by the motor, as is subsequently described.

As can be seen in FIG. 21, the first and second sensor switches 66, 67 are connected or interfaced to the microcontroller 224. The sensor switches 66, 67 are configured to detect the presence of a container on the blender base 32, and to determine which type of container is placed on the blender base. To this end, the microcontroller 224 can determine the presence of a container and/or the type of container by the combination of switches 66, 67 that have been actuated (e.g., by the switch actuators 80).

For example, the sensor switches 66, 67 may normally be in an opened position. In such an embodiment, the microcontroller 224 may be programmed such that, if none of the switches are closed, then the blender base 32 will not operate. If, however, one or both of the sensor switches 66, 67 is closed (e.g., by the switch actuators 80), the specific switch or switches that are closed indicate to the microcontroller exactly what container or type of container is on the blender base 32. As an example, when the collared jar 34 is placed on the blender base 32, the sensor actuators 80 depress the second sensor switch 67. Similarly, sensor actuators on the actuator collar 190 depress the second sensor switch 67 when the actuator collar is placed on the blender base. In contrast, when the food processor 40 is placed on the blender base 32, the first sensor switch 66 is depressed. Yet another container might engage and depress both the sensor switches 66, 67. As subsequently described, the microcontroller 224 may use the container information to provide particular functions for the blender base 32, or even to provide relative information on the display 236.

The sensor switches 66, 67 may be any kind of mechanical or electrical switch, which sends a signal or command, or closes/opens a circuit when actuated. Various sensor technologies (e.g., infrared, electrical, mechanical) may be used. Likewise, the switch actuators (e.g., the switch actuator 80) may be any configuration or technology that is necessary to trigger the sensor switches. In addition, more than two sensors may be used so that additional containers may be sensed. A single sensor may even be used that provides multiple functions (e.g., the blender base 32 does not operate if the sensor is not depressed, a first container presses the sensor one amount and sends a first signal to the microprocessor, and a second container presses the sensor a second amount and sends a second signal to the processor.

As previously discussed, for the embodiment of the collared jar 34 shown in the drawing, a plurality of switch actuators 80 are provided so that the collared jar may be attached to the blender base 32 from any direction and still trigger the proper sensor switch 67. As an alternative, a plurality of sensor switches, and only one actuator may be used, or a sensor switch and the corresponding actuator may be centrally located. In any event, it is preferred that, regardless the type of switch, the switch may be actuated if the respective container is placed on the blender base 32 in a variety of orientations.

Read only memory 228 is preprogrammed with various motor commands (e.g., direction of rotation, speed, duration, reversing of rotation, oscillation, etc.) designed to achieve a particular result. The preprogrammed motor commands are grouped together according to a function of the blender (e.g., the end result or purpose for which the blender will be used). For example, a first memory section 260 may contain a program with all the motor commands necessary to make salsa, and a second memory section 262 may contain a program with all the motor commands necessary to mix a drink, etc. These preprogrammed motor comments or routines may be written using any conventional programming language such as c plus, java, and the like.

The following is an example of a routine that works particularly well for salsa:

| SALSA |
| --- |
| High Speed, Forward Pulse: 1 second |
| High Speed, Reverse Pulse: 1 second |
| Repeat 29 times |

The above sequence has been found to produce salsa having ingredients thoroughly chopped, but none chopped so much as to make the salsa too fine. By alternating the forward and reverse pulses, the likelihood of food items being brought into contact with the blades increases. By having only short bursts of the chopping, the salsa is not made too fine. Although the above process has been found to work well, variations, such as increasing the number of bursts, or the length of the bursts, may be made for particular tastes (e.g., chunky salsa, different ingredients, etc). The first memory section 260 maintains instructions for the blender base 32 so that it may implement the above routine.

Examples of other routines are shown in FIGS. 25-27. These figures show example preprogrammed routines 264, 266, and 268 for making powdered drinks, batter, and milkshakes, respectively. Although the shown processes have been found to work well for their intended purposes, it can be understood that the processes shown are examples and variations of blender routines may produce similar results. The routines 264, 266, and 268 are written as executable instructions for the blender base 32, and are stored in discrete data sections of the read only memory 228. As subsequently described, the preprogrammed routines may be accessed and implemented upon selection on the user interface 222 of the related desired function for the blender base 32.

Figure 30:
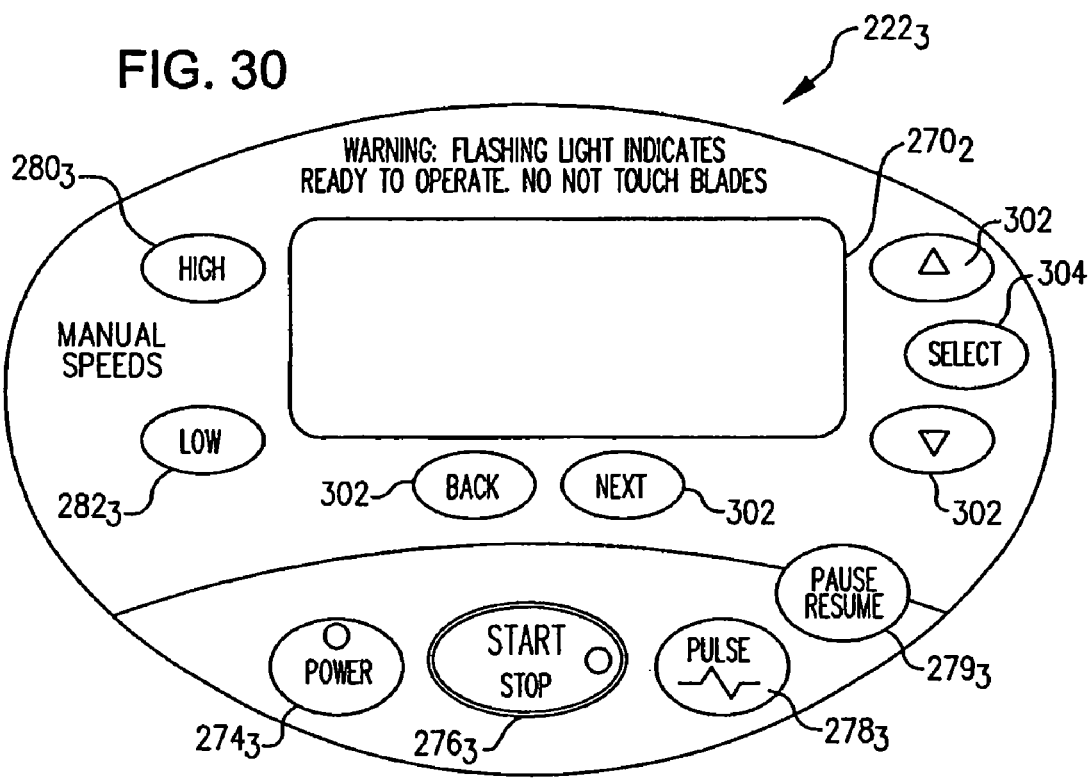
FIG. 30 shows a third example of a user interface that may be used on the blender base of FIG. 1.

FIGS. 28, 29, and 30 illustrate exemplary embodiments for user interfaces $222_1$, $222_2$, $222_3$ which may be used with the blender base 32. One type, shown in FIGS. 29 and 30, includes a liquid crystal display ("LCD") 270. A second type, shown in FIG. 28 may use one or more light emitting diodes ("LED") 272. Features that are common to the three user interfaces $222_1$, $222_2$, $222_3$ will be explained first, followed by a description of the differences between the user interfaces.

A power switch 274 is included on the LCD and LED variants of the user interface 222 to turn on or off the power. A start/stop switch 276 is also included to begin or stop operation of the blender.

A pulse switch 278 is provided that, when depressed, causes a temporary power surge to motor 234. In this manner, the pulse switch 234 serves as a temporary "start" button that will cause the motor to run, without hitting start/stop switch 276, as long as the pulse switch remains depressed. The pulse switch 278 also can be depressed after running a preprogrammed routine to run a continuation segment of the preprogrammed routine. To this end, the $E^2$ PROM 230 includes programming which stores information about the last operation run, and if that operation is a preprogrammed routine, the $E^2$ PROM may select an appropriate speed or operation to perform when pulse switch 278 is depressed. For example, for a given preprogrammed routine (e.g., salsa), a continuation operation may be stored in read only memory 228 (e.g., forward pulse, 1 second, followed by reverse pulse, one second). The continuation function runs upon activation of the pulse switch 278. Alternatively, the last speed and motor direction utilized by the preprogrammed routine may be stored in $E^2$ PROM 230, and that operation may be temporarily continued when a user pushes the pulse switch 278 after a program has ended. In any event, the continuation function continues to operate until the pulse switch 278 is released.

A pause/resume switch 279 may be used to stop the operation (e.g., a preprogrammed routine) of the blender when pressed a first time. The pause/resume switch 279 resumes operation of the blender from where it left off when pressed a second time.

The user interfaces $222_1$, $222_2$, $222_3$ also include manual speed switches 280 (high) and 282 (low) so that the user can manually control the speed and operating time of the blade unit 110 to perform other functions not preprogrammed into the blender. If desired, a motor speed indicator may be provided for the user interfaces $222_2$ and $222_3$ so that the user can monitor the relative speed of the motor (e.g., the relative speed of the rotation of blade unit 110) on the LCD 270 as the manual speed switches 280 or 282 are pressed. Such relative speed may be indicated by text, bars, symbols, or the like. With the LED-based user interface $222_1$, the relative speed of the motor may be indicated by the position of the lighted LEDS 272 relative to speed markers 284 (e.g., high, low; drink, food; etc.), or alternatively by the relative blinking speed of a lighted LED.

A plurality of preprogrammed function switches 286 are included on the LED-based user interface $222_1$ s of FIG. 28. The function switches 286 represent various programs for functions or end results that have been preprogrammed into the read only memory 228, as described above. For example, pressing or touching a function switch 290 labeled "salsa" will cause microcontroller 224 to access memory section 260 of read only memory 228 for the program containing preprogrammed motor commands used to make salsa, and the preprogrammed commands (e.g., the commands described above) are executed by microcontroller 224 to control the speed, pause time, and/or direction of the motor 234. To alert the user which function or program is running, a LED 292 can light up on the particular-function switch 286 that was pressed.

The LED-based variants user interface $222_1$ shown in FIG. 28 may include a progress indicator 294 that indicates the relative completion of the program by color, lighted LED, or other suitable indication means.

As described above, the user interfaces $222_2$ and $222_3$ utilize the display 236, such as a liquid crystal display (LCD) 270 or another type of display. In such an embodiment, the $E^2$ PROM 230 stores user-selectable parameters for the initial operation of the blender base 32. When the blender base 32 having an LCD 270 is turned on, the LCD 270 is initialized and set up in accordance with the stored programming from the $E^2$ PROM 230. Additionally, $E^2$ PROM 230 may include programming that allows the text in the LCD 270 to be displayed in multiple languages (e.g., English, Spanish) or units (e.g., metric, English).

The $E^2$ PROM 230 may further include subsequent storage of information in order to organize the LCD menu, for example based on the most commonly selected functions or programs (e.g., the creation of a "favorites list"). Alternatively, the $E^2$ PROM 230 may maintain a most recently used list so as to present recently-used functions or programs.

In an exemplary embodiment of a LCD-based user interface shown in FIG. 29, a plurality of function switches 300 are used to choose the various functions or programs for the blender. Here, the function switches 300 are lined up to correspond to a preprogrammed function/program displayed on the LCD $270_1$. To select the program displayed on the LCD $270_1$ screen, the user only need to press the corresponding function switch 300.

In another exemplary embodiment of a LCD-based user interface $222_3$ as shown in FIG. 30, navigation switches 302 are used to choose the various functions or programs for the blender. The navigation switches 302 are directional buttons (e.g., back, forward, up, down, or arrow symbols) that allow the user to navigate the LCD $270_2$ screen until a particular function/program is selected using the select switch 304. A progress indicator, and/or a manual speed indicator, may appear on the LCD $270_2$ screen.

The various switches described with reference to the user interfaces $222_1$, $222_2$, $222_3$ may be any kind of push button, membrane, or touch sensitive buttons or switch known in the art which sends a signal or command, or closes/opens a circuit when pressed or touched by the user. In addition, if desired, the display 236 may be a touch-sensitive screen, whereby a user may input operation functions by touching the screen. Additional control methods may also be used, such as voice-recognition programs, remote controls, or other features.

The microcontroller 224 may be programmed to implement only certain functions based on which container is detected by sensors 66, 67. For example, the microcontroller 224 may be preprogrammed to implement the motor commands for making powdered drinks only if a regular blender or single serving container (e.g., via the agitator collar 190) is placed on the blender base 32. Thus, if the sensors 66, 67 detect a food processor container on the blender base 32, then the microcontroller 224 will not allow the powdered drinks program/function to be selected and implemented. In such a circumstance, if the user wants to make powdered drinks with a food processor container, the user may do so manually using the manual speed switches 280 and 282.

The sensors 66, 67 and the microcontroller 224 may also be used to determine what items are displayed on the display 236. For example, if a mixing container (e.g., the collared jar 34 or a combination of the agitator collar 190 and an attached container) is sensed by the sensors 66, 67, then the microprocessor instructs display of preprogrammed routines for mixing containers.

Figure 31:
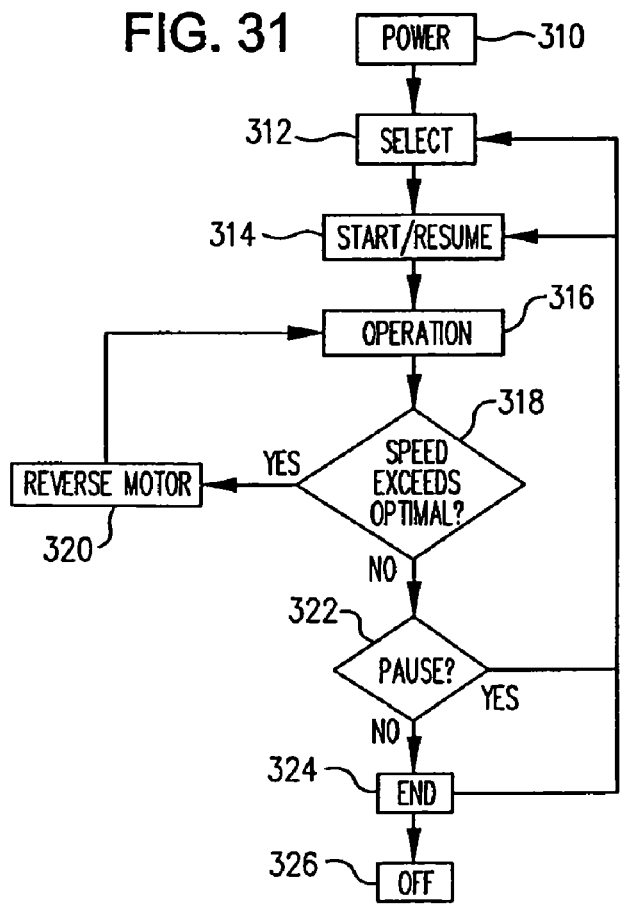
FIG. 31 shows a method of operating the blender base of FIG. 1 with the user interface of FIG. 28 in accordance with one aspect of the present invention.

FIG. 31 shows a process for operating the blender base 32 with the LED-based user interface $222_1$ in accordance with one aspect of the present invention. Beginning at step 310, the user first turns on the power by pressing the power switch $274_1$. After a container and blade unit (e.g., the collared jar 34 and the blade unit 112) have been properly secured to blender base 32, and food or drink is loaded into the collared jar, the user then selects a function/program for the blender base at step 312 by pressing any of the various function switches 286. If there is a particular function switch that is not available (e.g., no preprogrammed motor controls for that function), the user can manually control the motor with manual speed switches 280 and 282. Additionally, a preset function switch 286 may not work if the sensors 66, 67 detect an incompatible type of container for that function. Manual speed switches 280 and 282 could be used in that situation as well. An LED 292 on the selected function switch 286 lights up to indicate to the user the current selection.

Once a function is successfully chosen, the start/stop switch $276_1$ is pressed at step 314 to begin the programmed operation. The microcontroller 224 runs the motor 234 based on the preprogrammed motor commands stored in read only memory 228 for that selected function or program. As described above, preprogrammed motor commands may include instructions on, for example, how fast the motor will run, the direction of blade rotation, the reversal of the blade rotation direction, the duration of rotation in a given direction, the oscillation of the blade unit, etc. A soft start program 330 (FIG. 21) in the microcontroller 224 may be provided to control or slow the acceleration of the motor 234 to a desired speed for better processing or mixing than prior conventional blenders where the motor accelerates to the maximum speed as fast as possible.

As motor 234 runs during operation step 316, the progress of the program is displayed on the progress indicator 294 while the microcontroller 224 continues to execute the preprogrammed motor commands. If desired, the sensor 254 may be used to determine if the speed of the motor 234 has exceeded a threshold amount relative to the motor's torque-speed curve (step 318). If so, the microcontroller 224 may instruct the motor 234 accordingly. For example, the microcontroller 224 may instruct the motor to shut down. However, in accordance with one aspect of the present invention, for some preprogrammed routines, such as those that involve crushing and cutting of ice, the microcontroller 224 may instruct the motor to momentarily reverse direction, thereby possibly dislodging the cause of the strain on the motor (step 320). The process may then proceed back to operation (step 316). If desired, the microprocessor may try only a set amount of times (e.g., twice) to reverse and dislodge the motor 234.

At step 322, the pause/resume switch $279_1$ may be pressed by the user to temporarily stop the blender operation. The program remains in effect, but the implementation of the preprogrammed motor commands is suspended and the status stored so that when the pause/resume switch 26 is pressed again at block 35, the microcontroller 15 at operation block 36 will simply resume the program from where it left off. Thus, for example, if the program contained a preprogrammed motor command to rotate the motor at 60 rps for ten seconds, and the pause/resume switch 26 is pressed at step 322 five seconds into the program, then when the pause/resume switch 26 is pressed again at block 35, the motor will resume rotation at 60 rps for another five seconds before ending the program.

If the operation has not been paused, then the program simply continues until all of the preprogrammed motor commands for that function or program are fulfilled at step 324. A termination tone may sound to alert the user of the program completion. If the user is not satisfied with the result and would like to continue the same program for an arbitrary time period, the user may depress the pulse switch $278_1$ after the program ends.

The user can then turn off the blender at step 326, or begin the process again at step 314 by loading new materials into the collared jar 34 and then selecting a function/program.

Figure 32:
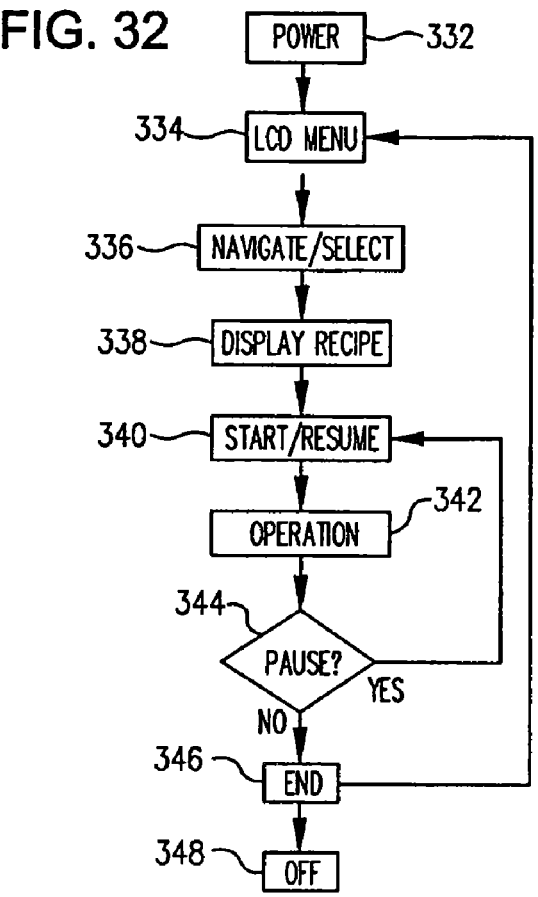
FIG. 32 shows a method of operating the blender base of FIG. 1 with the user interface of FIG. 29 or 30 in accordance with another aspect of the present invention.
Figure 33:
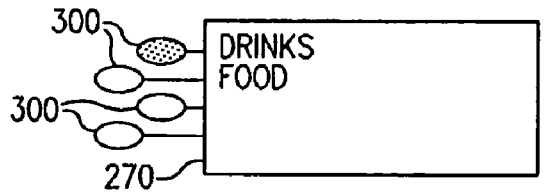
FIGS. 33-37 show displays of some functions that may be presented by the user interface of FIG. 29.

FIG. 32 illustrates a logic flowchart for the operation of the blender base 32 with an LCD-based user interface $222_2$ or $222_3$, in accordance with one aspect of the present invention. The power is first turned on at step 332 by pressing power switch 274. A menu of options (FIG. 33) is then displayed on the LCD 270 at step 334. A standard menu may appear each time the power is turned on, or the menu may vary depending on which container is placed on the base 2 as detected by sensors 66, 67. For example, if sensors 66, 67 identify a blender container (e.g., the collared jar 34) on the blender base 32, then the LCD menu 270 may display blender functions (e.g., a choice between drinks or food, as shown in FIG. 33) instead of food processor functions (e.g., fruits, vegetables, etc.) The menu may also include an option for choosing which language or measurement unit to display. Additionally, the menu may be set up depending on the functions or programs most frequently selected by the user. As described earlier, $E^2$ PROM 230 may be programmed to remember the most popular selections and to display them at the start of each operation for the user to choose.

At step 336, the user navigates through the LCD menu using the navigation switches 302 and makes selections using the select switch 304, or the user simply makes a selection using the function switch 300. If a particular function is not available on the menu, the user may manually control the motor with manual speed switches 280 and 282. A function may not be displayed if the preprogrammed motor controls for that function are not available, or if that function is not available for the type of container detected by sensor 66, 67.

Figure 34:
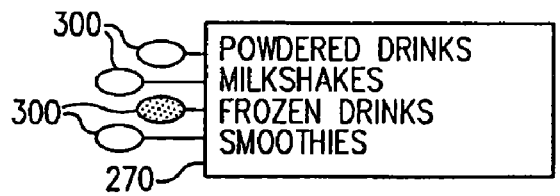
Figure 35:
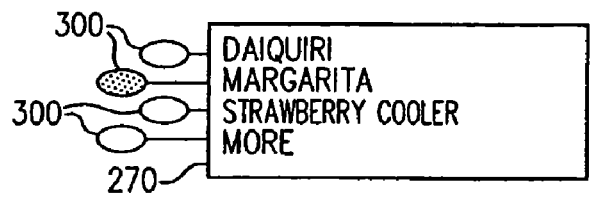

In any event, in the examples shown in FIG. 33, "Drinks" are chosen by the user, which navigates the user to a screen (FIG. 34) where the user is shown a number of types of drinks that may be mixed by the blender. After choosing "frozen drinks," the user is navigated to a screen (FIG. 35) showing particular drinks. The user selects "Margarita."

Figure 36:
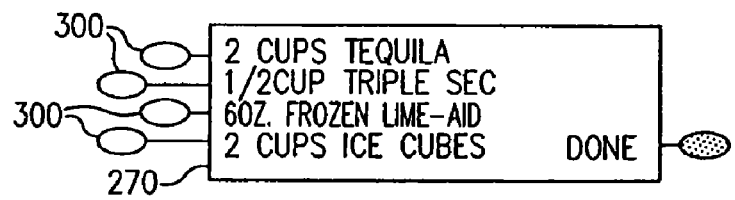

In accordance with one aspect of the present invention, the read only memory includes recipes and/or instructions for blending or processing certain items of food or drinks. The recipe is presented to the user in step 338. An example of a recipe for a margarita is shown in FIG. 36. The user may then select "done" to go forward with the preprogrammed routine for the margarita.

Once a function is chosen, the start/stop switch 276 is then pressed at step 340 to begin the operation. The microcontroller 224 then runs the motor 234 based on the preprogrammed motor commands stored in read only memory 228 for that selected function/program.

Figure 37:
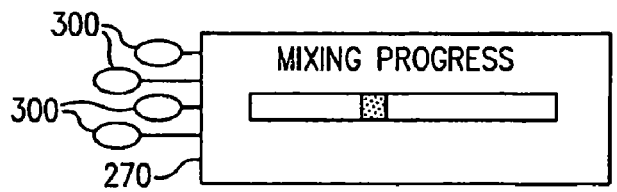

As the motor 234 runs at operation step 342, the progress of the program is displayed on the LCD 270 (FIG. 37) while the microcontroller 224 continues to monitor and implement the preprogrammed motor commands. As described earlier, the microcontroller 224 may also be programmed with an enhanced speed control for the motor as well as a sensor control.

At step 344, the pause/resume switch 279 may be pressed to temporarily stop the program (e.g., suspending the current implementation of preprogrammed motor commands). The status of these commands are stored by $E^2$ PROM 230 so that when the pause/resume switch 279 is pressed again at step 340, the microcontroller 224 at operation step 342 will simply run the program from where it left off.

If the operation has not been paused, then the program simply continues until all of the preprogrammed motor commands for that function are fulfilled at step 346. A termination tone may sound to alert the user of the program completion. If the user is not satisfied with the result and would like to continue the same program for an arbitrary time period, the user may depress the pulse switch 278 after the program ends.

At the end of the program, the LCD 270 returns to step 334 to display the menu again and the user may proceed with another operation. Alternatively, the user may turn off the blender base 32 at step 348.

In accordance with one aspect of the present invention, as a routine is running, a user may activate one of the manual speed buttons 280, 282. Preferably, doing so causes the motor speed for each operation during the routine to increment. The amount each step increments may be determined based upon how long the manual speed buttons are depressed. Alternatively, the motor speed may be changed for only the particular segment of the routine that is currently operating. Preferably, the changes are not recorded to the read only memory 228 so that the routine operates in the original modes (e.g., speeds) when the routine is subsequently selected. Alternatively, a programming or similar button may be provided to permanently save the changes.

Preferably, in accordance with one aspect of the present invention, the blender base 32 includes an audible tone indicator 349 (FIG. 21) that is associated with the microcontroller 224. The audible tone indicator may be a buzzer, a bell, a whistle, a recording of a human voice or the like, that gives an audible tone when the programmed routines are complete, when the user needs to add ingredients to a recipe, or anytime that the user presses a button for simple feedback.

Figure 38:
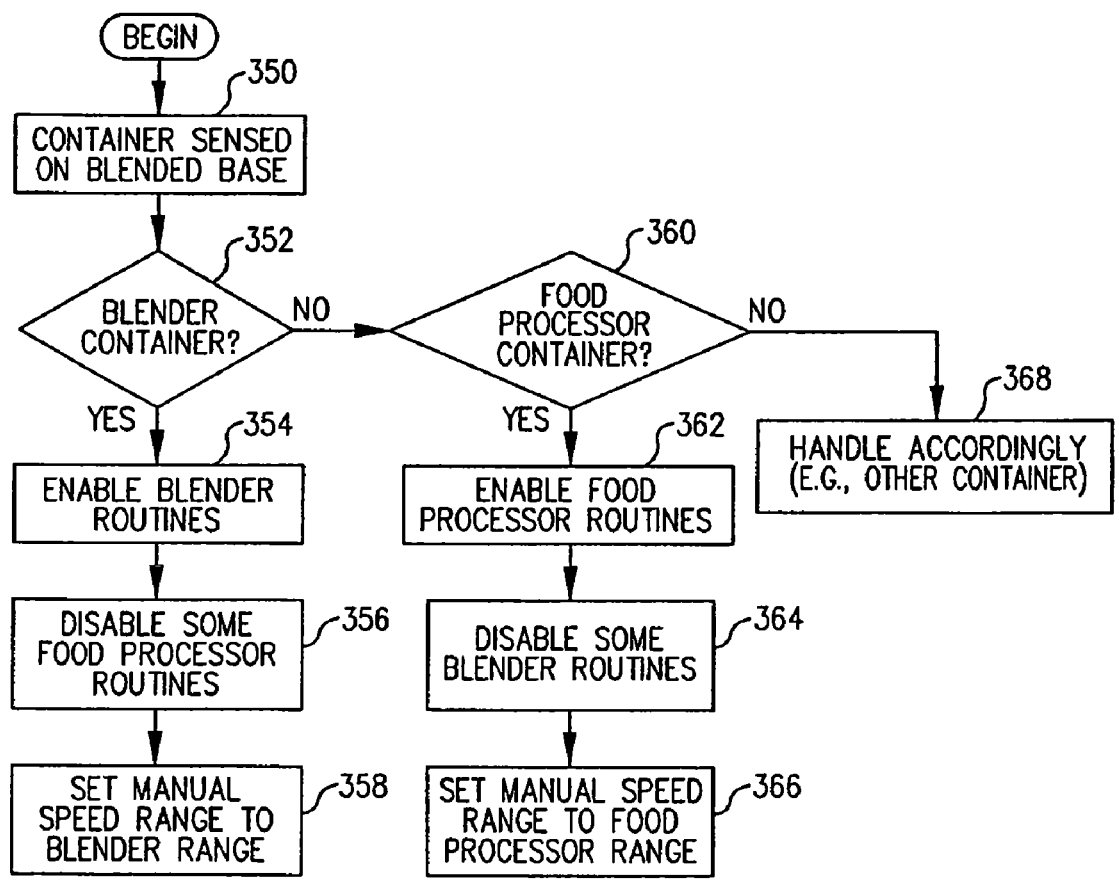
FIG. 38 shows a method of enabling functions for a blender base in accordance with a particular container sensed the blender base in accordance with one aspect of the present invention.

FIG. 38 shows a process for setting possible operations of the blender base 32 in accordance with the particular container (e.g., blender container or food processor container) located on the blender base. Beginning at step 350, the sensors 66, 67 determine the presence of a container on the blender base 32. If the container is a blender container (e.g., the collared jar 34 or the threaded jar 36), then step 352 branches to step 354, where the microcontroller enables blender routines for the blender base 32. As described earlier, this may, for example, involve displaying the routines on the LCD user interface 222₂ or 222₃, or making blender function buttons available and active on the LED user interface 222₁. In addition, some other processes, such as food processor routines, may be disabled or not available (step 356).

In accordance with one aspect of the present invention, the manual speed range for the blender base may be determined by the type of container present on the blender base 32. For example, the manual speed range may be higher for a blender container, and lower for a food processor container, so that the respective blades of these two containers may operate at their standard speeds. Thus, in accordance with this aspect of the present invention, the manual speed of blender base is set to blender at step 358.

If the container is not a blender container, step 352 branches to step 360, where a determination is made if the container is a food processor container. If so, step 360 branches to step 362, where food processor routines are enabled. Likewise, some routines, e.g., blender routines, may be disabled (step 364). The manual speed of the blender base 32 is set to the food processor range in step 366.

If the container is neither a blender container or a food processor container, then step 360 branches to step 368, where the microcontroller handles accordingly. For example, a separate type of container may be utilized with the blender base 32, and routines and/or a particular speed range may be available for that type of container.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A blender base assembly comprising:
    a blender base configured for attachment to a blender container or jar;
    a blade unit removably attached to the base;
    a reversible motor connectable to the removable blade unit;
    a sensor associated with the motor and operative to sense strain in the motor; and
    a microcontroller in communication with the sensor and the motor, the microcontroller being operative to reverse the direction of the motor in response to the sensor sensing a predetermined strain in the motor.

2. The blender base assembly of claim 1, wherein the microcontroller is operative to reverse the direction of the motor for a first period of time, and then reverse the motor back to an original operating direction.

3. The blender base assembly of claim 1, wherein the microprocessor comprises memory, and wherein the memory comprises preprogrammed motor routines, the microcontroller being operative to retrieve a respective preprogrammed motor routine from the memory in response to user selection of the respective preprogrammed motor routine.

4. The blender base assembly of claim 3, wherein the microcontroller is operative to reverse the direction of the motor in response to the sensor sensing a predetermined strain in the motor during operation of one of the preprogrammed motor routines.

\* \* \* \* \*